United States Patent
Chaugule et al.

(10) Patent No.: US 12,160,927 B2
(45) Date of Patent: Dec. 3, 2024

(54) PRIMARY eSIM ACTIVATION FOR WIRELESS DEVICE WITH PHYSICAL SIM

(71) Applicant: Apple Inc., Cupertino, CA (US)

(72) Inventors: Raj S. Chaugule, Santa Clara, CA (US); He Zheng, Irvine, CA (US); Li Li, Los Altos, CA (US); Vikram Bhaskara Yerrabommanahalli, Saratoga, CA (US); Chandiramohan Vasudevan, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/458,993

(22) Filed: Aug. 30, 2023

(65) Prior Publication Data

US 2023/0413034 A1  Dec. 21, 2023

Related U.S. Application Data

(63) Continuation of application No. 17/446,939, filed on Sep. 3, 2021, now Pat. No. 11,758,384.

(51) Int. Cl.
*H04W 12/42* (2021.01)
*H04W 8/18* (2009.01)
*H04W 8/20* (2009.01)
*H04W 60/04* (2009.01)

(52) U.S. Cl.
CPC .......... *H04W 8/183* (2013.01); *H04W 8/205* (2013.01); *H04W 12/42* (2021.01); *H04W 60/04* (2013.01)

(58) Field of Classification Search
None
See application file for complete search history.

(56) References Cited

U.S. PATENT DOCUMENTS

| 11,758,384 B2 * | 9/2023 | Chaugule | H04W 12/42 455/418 |
|---|---|---|---|
| 2021/0014669 A1 | 1/2021 | Goyal et al. | |
| 2023/0073252 A1 | 3/2023 | Chaugule et al. | |

\* cited by examiner

*Primary Examiner* — Gary Lafontant
(74) *Attorney, Agent, or Firm* — DICKINSON WRIGHT RLLP

(57) ABSTRACT

This Application sets forth techniques for provisioning and activating an electronic subscriber identity module (eSIM) as a primary SIM for a mobile wireless device that includes a limited functionality physical SIM (pSIM) associated with a particular mobile network operator (MNO) and installed in the mobile wireless device at a time of manufacture. An eSIM associated with the particular MNO is reserved during a sales order process and later activated during device activation after receipt by a user using a secure over-the-air (OTA) cellular connection enabled by the limited functionality pSIM, when a non-cellular connection or other Internet accessible connection is available. Dual SIM device configuration processes can be suppressed during activation of the eSIM. After successful attachment of the mobile wireless device to a cellular wireless network of the particular MNO using credentials of the eSIM, the limited functionality pSIM is disabled.

20 Claims, 19 Drawing Sheets

DUAL SIM SETUP USER INTERFACE

400

Add Cellular Plan

A cellular plan from "Wireless Provider" can be added to this device

[ Add Cellular Plan ]

Cellular Plan Labels

Choose labels for each cellular plan

+1 (202) 555-0001
Line 1

+1 (202) 555-2222
Line 2

[ Continue ]

Default Line for Voice Calls and Messaging

Choose a default line

+1 (202) 555-0001
Line 1

+1 (202) 555-2222
Line 2

[ Continue ]

Default Line for Select Applications

Choose a line to use for select applications

+1 (202) 555-0001
Line 1

+1 (202) 555-2222
Line 2

[ Continue ]

Cellular Data

Choose a default line for cellular data

+1 (202) 555-0001
Line 1

+1 (202) 555-2222
Line 2

[ Done ]

DUAL SIM SETUP FLOW

860

PSIM DISABLEMENT FLOW

PRIMARY eSIM ACTIVATION FOR WIRELESS DEVICE WITH PHYSICAL SIM

CROSS-REFERENCE TO RELATED APPLICATIONS

The present application is a continuation of U.S. Non-Provisional application Ser. No. 17/446,939, entitled "PRIMARY eSIM ACTIVATION FOR WIRELESS DEVICE WITH PHYSICAL SIM," filed Sep. 3, 2021, the content of which is incorporated by reference herein in its entirety for all purposes.

FIELD

The described embodiments set forth techniques for activating an electronic subscriber identity module (eSIM) as a primary SIM provisioned for a mobile wireless device that includes a limited functionality physical SIM (pSIM) at time of manufacture. An eSIM is reserved for the mobile wireless device as part of a sales order and later activated when device activation of the mobile wireless device occurs after receipt by a user using an over-the-air (OTA) connection established via the limited functionality pSIM.

BACKGROUND

Many mobile wireless devices are configured to use removable Universal Integrated Circuit Cards (UICCs) that enable the mobile wireless devices to access services provided by Mobile Network Operators (MNOs). In particular, each UICC includes at least a microprocessor and a read-only memory (ROM), where the ROM is configured to store an MNO profile that the wireless device can use to register and interact with an MNO to obtain wireless services via a cellular wireless network. A profile may also be referred to as subscriber identity module (SIM). Typically, a UICC takes the form of a small removable card, commonly referred to as a SIM card, which is inserted into a UICC-receiving bay of a mobile wireless device. In more recent implementations, UICCs are being embedded directly into system boards of wireless devices as embedded UICCs (eUICCs), which can provide advantages over traditional, removable UICCs. The eUICCs can include a rewritable memory that can facilitate installation, modification, and/or deletion of one or more electronic SIMs (eSIMs) on the eUICC, where the eSIMs can provide for new and/or different services and/or updates for accessing extended features provided by MNOs. An eUICC can store a number of MNO profiles—also referred to herein as eSIMs—and can eliminate the need to include UICC-receiving bays in wireless devices.

A mobile wireless device, at initial acquisition by an end user via a sales channel, can be pre-ordered in various configurations, such as: i) reserving a pSIM as a primary SIM for access to services of a particular MNO, ii) reserving an eSIM as a primary SIM for access to services of the particular MNO but excluding the pSIM, and iii) without designating a pSIM or eSIM for a particular MNO, among others. Mobile wireless devices purchased as SIM-free, can require a user to acquire and insert a fully active pSIM card in order to activate the mobile wireless device for cellular wireless service or to activate the mobile wireless device via a non-cellular wireless connection, which may not be available. There exists a need for methods to provide for purchasing a mobile wireless device with an eSIM reserved for the mobile wireless device and subsequently activated, as part of a device activation process performed on the mobile wireless device after acquisition by the user, when neither a cellular connection via a fully functional pSIM card nor a non-cellular connection is available for the mobile wireless device to use for the activation process.

SUMMARY

This Application sets forth techniques for activating an electronic subscriber identity module (eSIM) as a primary SIM provisioned for a mobile wireless device that includes a limited functionality physical SIM (pSIM) associated with a particular mobile network operator (MNO) at a time of manufacture. An eSIM associated with the MNO is reserved for the mobile wireless device as part of a sales order and later activated when device activation of the mobile wireless device occurs after receipt by a user using an over-the-air (OTA) connection established via the limited functionality pSIM. During purchase of the mobile wireless device, a user can select a device configuration option for eSIM installation as a primary SIM in place of a physical SIM as the primary SIM to access services of a particular MNO. The mobile wireless device can be manufactured with a limited functionality pSIM (and not include a fully functional pSIM), where the limited functionality pSIM can be used when activation of the primary eSIM requires an over-the-air (OTA) cellular connection to access one or more manufacturer servers and/or MNO network-based servers. For example, a non-cellular connection, such as a Wi-Fi connection or a hard-wired connection, such as via a computer, to gain access to the network-based servers for activation of the eSIM can be unavailable. The limited functionality pSIM can be used to establish the OTA cellular connection to download and activate the primary eSIM for the mobile wireless device. In some embodiments, during the manufacturing process, an integrated circuit card identifier (ICCID) value associated with the limited functionality pSIM installed in the mobile wireless device is provided by the manufacturing facility to a device manufacturer server. As part of a sales order process, a device manufacturer server receives from an MNO server a message indicating that an eSIM is reserved for provisioning as a primary SIM to the mobile wireless device. The message can include identifiers for the mobile wireless device and for the reserved eSIM. The message can also include an indication that activation of the eSIM is delayed until device activation of the mobile wireless device. During the device activation process for the mobile wireless device, after receipt of the mobile wireless device by the user, activation of the eSIM is authorized and confirmed by communication between the mobile wireless device and both device manufacturer servers and MNO servers. The mobile wireless device can obtain, from a device manufacturer server, eSIM installation information, which in some embodiments is accompanied by the ICCID value of the limited functionality pSIM associated with the mobile wireless device during manufacturing. When available, the mobile wireless device can determine whether the ICCID value received from the device manufacturer server matches a corresponding ICCID value of a pSIM installed in the mobile wireless device. When the match is confirmed and a cellular connection is required, the mobile wireless device can establish an OTA cellular connection using the limited functionality pSIM to a specific access point name (APN) used for SIM activation by the MNO. The specific APN can be additionally used to carry data traffic to download and install the eSIM via the OTA cellular connection to the mobile wireless device. In some embodiments, when the ICCID value is not available, the mobile wireless device alternatively determines whether the pSIM included in the mobile wireless device corresponds to a particular MNO, e.g., using information from a carrier bundle included in the mobile wireless device, and whether the pSIM is a limited functionality pSIM, e.g., by communicating with an entitlement server of the particular MNO. After successful installation of the eSIM, the mobile wireless device includes a fully functional eSIM and a limited functionality pSIM. In some embodiments, the mobile wireless device can suppress dual SIM dual standby (DSDS) device configuration processes that may arise, when the mobile wireless device is configured with a single, fully active eSIM only. In some embodiments, the mobile wireless device re-checks whether certain conditions are met before suppressing the DSDS device configuration processes, e.g., by re-checking the pSIM ICCID value and limited functionality state of the pSIM included in the mobile wireless device. After installation of the eSIM, the mobile wireless device can use a monitor mode to account for propagation delay of MNO activation processes through MNO back-end servers, e.g., by disabling and re-enabling the eSIM until initial attachment of the mobile wireless device to a cellular wireless network of the MNO associated with the eSIM succeeds. After successful attachment to the cellular wireless network of the MNO using credentials of the installed eSIM, the mobile wireless device can disable the limited functionality pSIM.

Other aspects and advantages of the invention will become apparent from the following detailed description taken in conjunction with the accompanying drawings which illustrate, by way of example, the principles of the described embodiments.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, wherein like reference numerals designate like structural elements.

FIG. 4A illustrates an exemplary sequence of user interface screens for dual SIM setup for a mobile wireless device, according to some embodiments.

DETAILED DESCRIPTION

Figure 1:
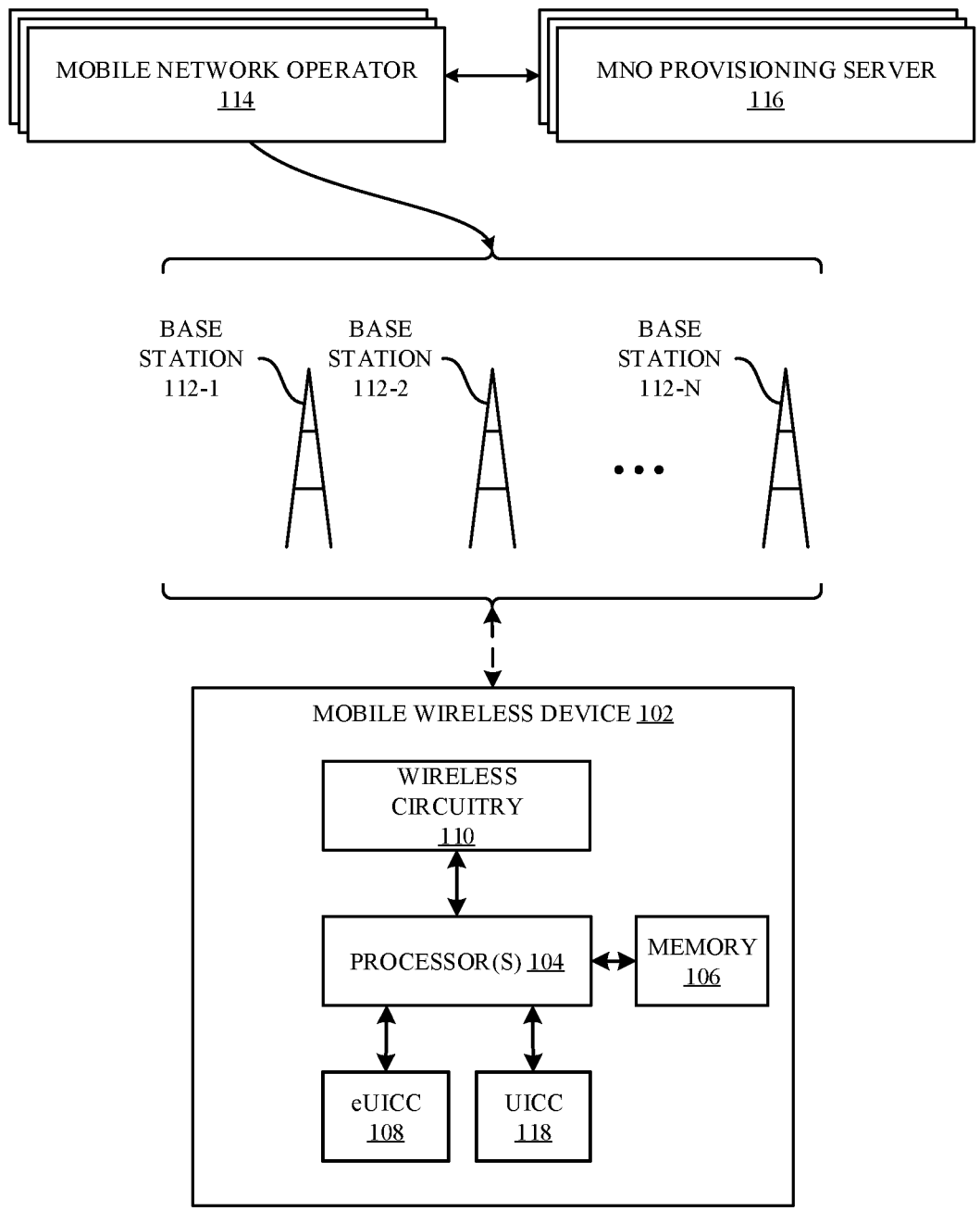
FIG. 1 illustrates a block diagram of different components of an exemplary system configured to implement the various techniques described herein, according to some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

This Application sets forth techniques for activating an electronic subscriber identity module (eSIM) as a primary SIM provisioned for a mobile wireless device that includes a limited functionality physical SIM (pSIM) associated with a particular mobile network operator (MNO) at a time of manufacture. A single stock keeping unit (SKU) can be used by a manufacturing facility, a distribution entity, and/or a retail sales outlet for mobile wireless devices that include a limited functionality pSIM associated with the particular MNO. The limited functionality pSIM can be used to establish connections to download, install, and subsequently activate a primary eSIM for the mobile wireless device or can be used to update and activate the pSIM to become a fully functional pSIM for the mobile wireless device to access cellular wireless services of the particular MNO. A separate SKU for a mobile wireless device that does not include a pSIM, e.g., for an eSIM only mobile wireless device for the particular MNO, is not required, as the limited functionality pSIM can be used for provisioning and activation of an eSIM for the eSIM only mobile wireless device. The limited functionality pSIM can be subsequently disabled when cellular wireless connectivity to the particular MNO using the provisioned and activated eSIM succeeds.

An eSIM associated with the particular MNO is reserved for the mobile wireless device as part of a sales order and later activated when device activation of the mobile wireless device occurs, e.g., after receipt by a user using an over-the-air (OTA) connection established via the limited functionality pSIM. During purchase of the mobile wireless device, a user can select a device configuration option for eSIM installation as a primary SIM in place of a physical SIM to access services of a particular MNO. The mobile wireless device can be manufactured with the limited functionality pSIM (and not include a fully functional pSIM), where the limited functionality pSIM can be used when activation of the primary eSIM requires an over-the-air (OTA) cellular connection to access one or more manufacturer and MNO network-based servers. For example, a non-cellular connection, such as a Wi-Fi connection or a hard-wired connection, such as via a computer, to gain access to both MNO and device manufacturer network-based servers for activation of the eSIM may be unavailable to use for activation of the primary eSIM. The limited functionality pSIM can be used to establish the OTA cellular connection to download and activate the primary eSIM for the mobile wireless device, particularly when a non-cellular connection or other Internet reachable connection cannot otherwise be established for the mobile wireless device. In some embodiments, data traffic for downloading and installation of the primary eSIM can be through a designated activation access point name (APN) available for OTA connections via the limited functionality pSIM. In some embodiments, the designated activation APN is specific to the particular MNO associated with the limited functionality pSIM.

As part of a sales order process, a device manufacturer server receives from an MNO server a message indicating an eSIM is reserved for provisioning to the mobile wireless device, the message including identifiers for the mobile wireless device and for the reserved eSIM. The message can also include an indication that activation of the eSIM is delayed until device activation of the mobile wireless device. During the device activation process for the mobile wireless device, after receipt of the mobile wireless device by the user, activation of the eSIM is authorized and confirmed by communication between the mobile wireless device and both device manufacturer servers and MNO servers via the OTA cellular connection using the limited functionality pSIM.

The mobile wireless device can obtain, from a device manufacturer server, eSIM installation information, which in some embodiments is accompanied by the ICCID value of the limited functionality pSIM associated with the mobile wireless device during manufacturing. When the ICCID value of the limited functionality pSIM installed in the mobile wireless device at the time of manufacture is available, the mobile wireless device can determine whether the ICCID value received from the device manufacturer server matches a corresponding ICCID value of a pSIM installed in the mobile wireless device. When the match is confirmed and a cellular connection is required, the mobile wireless device can establish the OTA cellular connection using the limited functionality pSIM to the specific APN used for SIM activation by the MNO. The specific APN can be additionally used to carry data traffic to download and install the eSIM via the OTA cellular connection to the mobile wireless device. In some embodiments, when the ICCID value of the limited functionality pSIM installed in the mobile wireless device at the time of manufacture is not available, the mobile wireless device alternatively determines i) whether the pSIM included in the mobile wireless device corresponds to a particular MNO, e.g., using information from a carrier bundle included in the mobile wireless device, and ii) whether the pSIM is a limited functionality pSIM, e.g., by communicating with an entitlement server of the particular MNO to determine a status of the pSIM.

After successful installation of the eSIM, the mobile wireless device includes both a fully functional eSIM and a limited functionality pSIM, which can resemble a dual SIM configuration. In some embodiments, the mobile wireless device can suppress dual SIM dual standby (DSDS) device configuration processes that may arise, when the mobile wireless device is configured with a single, fully active eSIM only (and does not include a fully functional pSIM). In some embodiments, the mobile wireless device checks whether certain conditions are met before suppressing the DSDS device configuration processes, e.g., i) by re-checking matching of the presently installed pSIM ICCID value to the limited functionality pSIM (previously installed at time of manufacture) and/or ii) by determining the pSIM included in the mobile wireless device is a warm pSIM with limited functionality for establishing cellular connections (and is not a cold pSIM with no cellular connection capability or a hot pSIM with fully functional cellular connection capability). After installation of the eSIM, the mobile wireless device can use a monitor mode to account for propagation delay that may be incurred by MNO activation processes to complete activation of the eSIM through MNO back-end servers. For example, the monitor mode can include repeatedly disabling and re-enabling the eSIM until initial attachment of the mobile wireless device to a cellular wireless network of the MNO associated with the eSIM succeeds. After successful attachment to the cellular wireless network of the MNO using credentials of the installed eSIM, the mobile wireless device can disable the limited functionality pSIM.

These and other embodiments are discussed below with reference to FIGS. 1-11; however, those skilled in the art will readily appreciate that the detailed description given herein with respect to these figures is for explanatory purposes only and should not be construed as limiting.

FIG. 1 illustrates a block diagram of different components of a system 100 that is configured to implement the various techniques described herein, according to some embodiments. More specifically, FIG. 1 illustrates a high-level overview of the system 100, which, as shown, includes a mobile wireless device 102, which can also be referred to as a wireless device, a wireless device, a mobile device, a user equipment (UE) and the like, a group of base stations 112-1 to 112-N that are managed by different Mobile Network Operators (MNOs) 114, and a set of provisioning servers 116 that are in communication with the MNOs 114. Additional MNO infrastructure servers, such as used for account management and billing are not shown. The mobile wireless device 102 can represent a mobile computing device (e.g., an iPhone® or an iPad® by Apple®), the base stations 112-1 to 112-n can represent cellular wireless network entities including evolved NodeBs (eNodeBs or eNBs) and/or next generation NodeBs (gNodeBs or gNB) that are configured to communicate with the mobile wireless device 102, and the MNOs 114 can represent different wireless service providers that provide specific cellular wireless services (e.g., voice and data) to which the mobile wireless device 102 can subscribe, such as via a subscription account for a user of the mobile wireless device 102.

As shown in FIG. 1, the mobile wireless device 102 can include processing circuitry, which can include one or more processor(s) 104 and a memory 106, an embedded Universal Integrated Circuit Card (eUICC) 108, and a baseband wireless circuitry 110 used for transmission and reception of cellular wireless radio frequency signals. The baseband wireless circuitry 110 can include analog hardware components, such as antennas and amplifiers, as well as digital processing components, such as signal processors (and/or general/limited purpose processors) and associated memory. In some embodiments, the mobile wireless device 102 includes one or more physical UICCs 118, also referred to as Subscriber Identity Module (SIM) cards, in addition to or substituting for the eUICC 108. The components of the mobile wireless device 102 work together to enable the mobile wireless device 102 to provide useful features to a user of the mobile wireless device 102, such as cellular wireless network access, non-cellular wireless network access, localized computing, location-based services, and Internet connectivity. The eUICC 108 can be configured to store multiple electronic SIMs (eSIMs) for accessing cellular wireless services provided by different MNOs 114 by connecting to their respective cellular wireless networks through base stations 112-1 to 112-N. For example, the eUICC 108 can be configured to store and manage one or more eSIMs for one or more MNOs 114 for different subscriptions to which the mobile wireless device 102 is associated. To be able to access services provided by an MNO, an eSIM is reserved for subsequent download and installation to the eUICC 108. In some embodiments, the eUICC 108 obtains one or more eSIMs from one or more associated provisioning servers 116 as part of a device initialization of the mobile wireless device 102, such as when purchasing a new mobile wireless device 102. The provisioning servers 116 can be maintained by a manufacturer of the mobile wireless device 102, the MNOs 114, third party entities, and the like. Communication of eSIM data between an MNO provisioning server 116 and the eUICC 108 (or between the MNO provisioning server 116 and processing circuitry of the mobile wireless device 102 external to the eUICC 108, e.g., the processor 104) can use a secure communication channel.

The mobile wireless device 102, upon initial acquisition by a user, can lack an activated eSIM and require the user to download a functional eSIM for the MNO 114 from a corresponding MNO provisioning server 116. The mobile wireless device 102 can be manufactured to include a physical SIM (pSIM) with limited functionality, e.g., to connect to particular servers or access point names (APNs) associated with the MNO 114 for eSIM provisioning. As part of a sales order process, the user of the mobile wireless device 102 can opt for an eSIM (in place of a fully functional pSIM) for the mobile wireless device 102. Network-based servers managed by the MNO 114 associated with the eSIM can communicate with additional network-based servers managed by a device manufacturer and/or by a third party entity to integrate a device activation process for the mobile wireless device 102 with provisioning and activation of one or more eSIMs to the mobile wireless device 102. Upon activation of the eSIM, the mobile wireless device 102 can connect to the cellular wireless network of the MNO 114 to access services provided therefrom. After successful connection to the cellular wireless network of the MNO 114, the mobile wireless device 102 can disable the limited functionality pSIM included in the mobile wireless device 102 at the time of manufacture.

Figure 2:
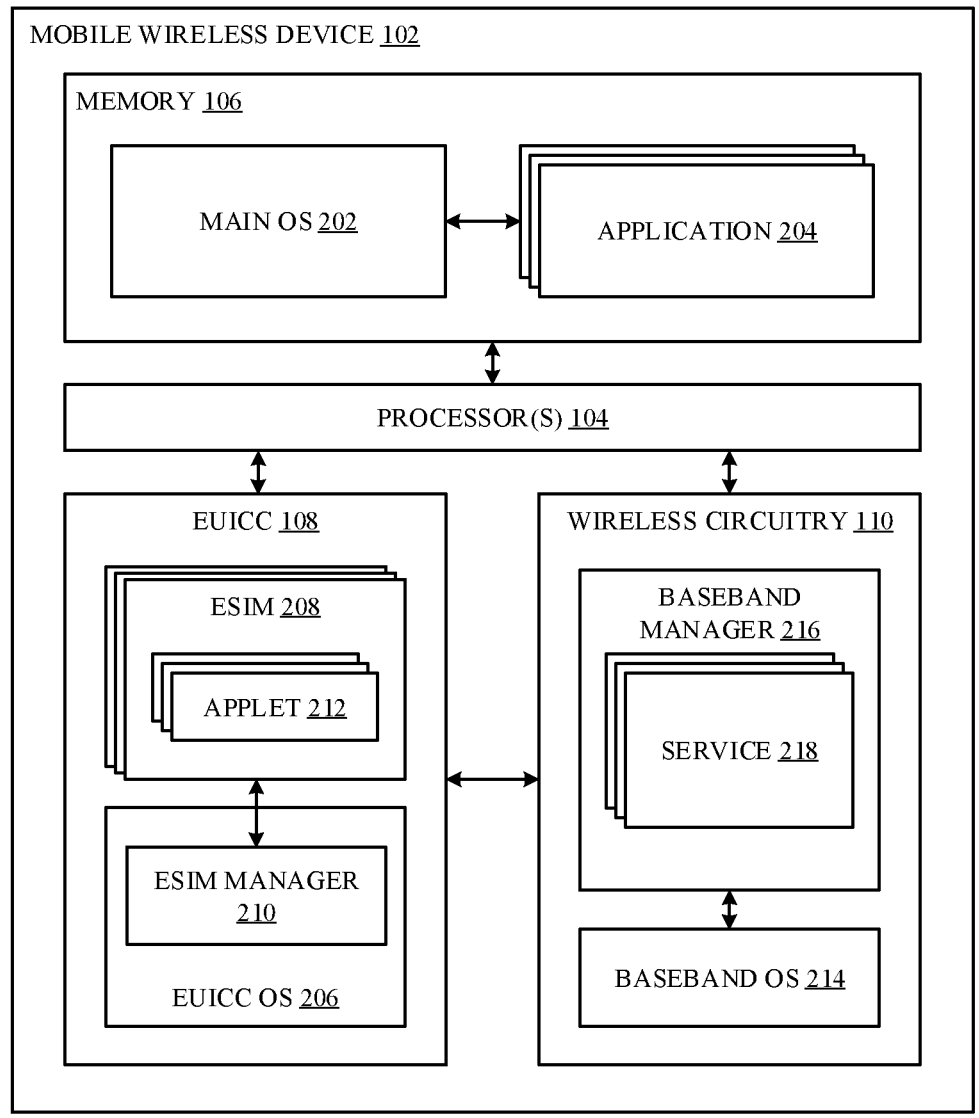
FIG. 2 illustrates a block diagram of a more detailed view of exemplary components of the system of FIG. 1, according to some embodiments.

FIG. 2 illustrates a block diagram of a more detailed view 200 of particular components of the mobile wireless device 102 of FIG. 1, according to some embodiments. As shown in FIG. 2, the processor(s) 104, in conjunction with memory 106, can implement a main operating system (OS) 202 that is configured to execute applications 204 (e.g., native OS applications and user applications). As also shown in FIG. 2, the eUICC 108 can be configured to implement an eUICC OS 206 that is configured to manage hardware resources of the eUICC 108 (e.g., a processor and a memory embedded in the eUICC 108). The eUICC OS 206 can also be configured to manage eSIMs 208 that are stored by the eUICC 108, e.g., by downloading, installing, deleting, enabling, disabling, modifying, or otherwise performing management of the eSIMs 208 within the eUICC 108 and providing baseband wireless circuitry 110 with access to the eSIMs 208 to provide access to wireless services for the mobile wireless device 102. The eUICC 108 OS can include an eSIM manager 210, which can perform management functions for various eSIMs 208. According to the illustration shown in FIG. 2, each eSIM 208 can include a number of applets 212 that define the manner in which the eSIM 208 operates. For example, one or more of the applets 212, when implemented in conjunction with baseband wireless circuitry 110 and the eUICC 108, can be configured to enable the mobile wireless device 102 to communicate with an MNO 114 and provide useful features (e.g., phone calls and internet access) to a user of the mobile wireless device 102.

As also shown in FIG. 2, the baseband wireless circuitry 110 of the mobile wireless device 102 can include a baseband OS 214 that is configured to manage hardware resources of the baseband wireless circuitry 110 (e.g., a processor, a memory, different radio components, etc.). According to some embodiments, the baseband wireless circuitry 110 can implement a baseband manager 216 that is configured to interface with the eUICC 108 to establish a secure channel with an MNO provisioning server 116 and obtaining information (such as eSIM data) from the MNO provisioning server 116 for purposes of managing eSIMs 208. The baseband manager 216 can be configured to implement services 218, which represents a collection of software modules that are instantiated by way of the various applets 212 of enabled eSIMs 208 that are included in the eUICC 108. For example, services 218 can be configured to manage different connections between the mobile wireless device 102 and MNOs 114 according to the different eSIMs 208 that are enabled within the eUICC 108.

Figure 3A:
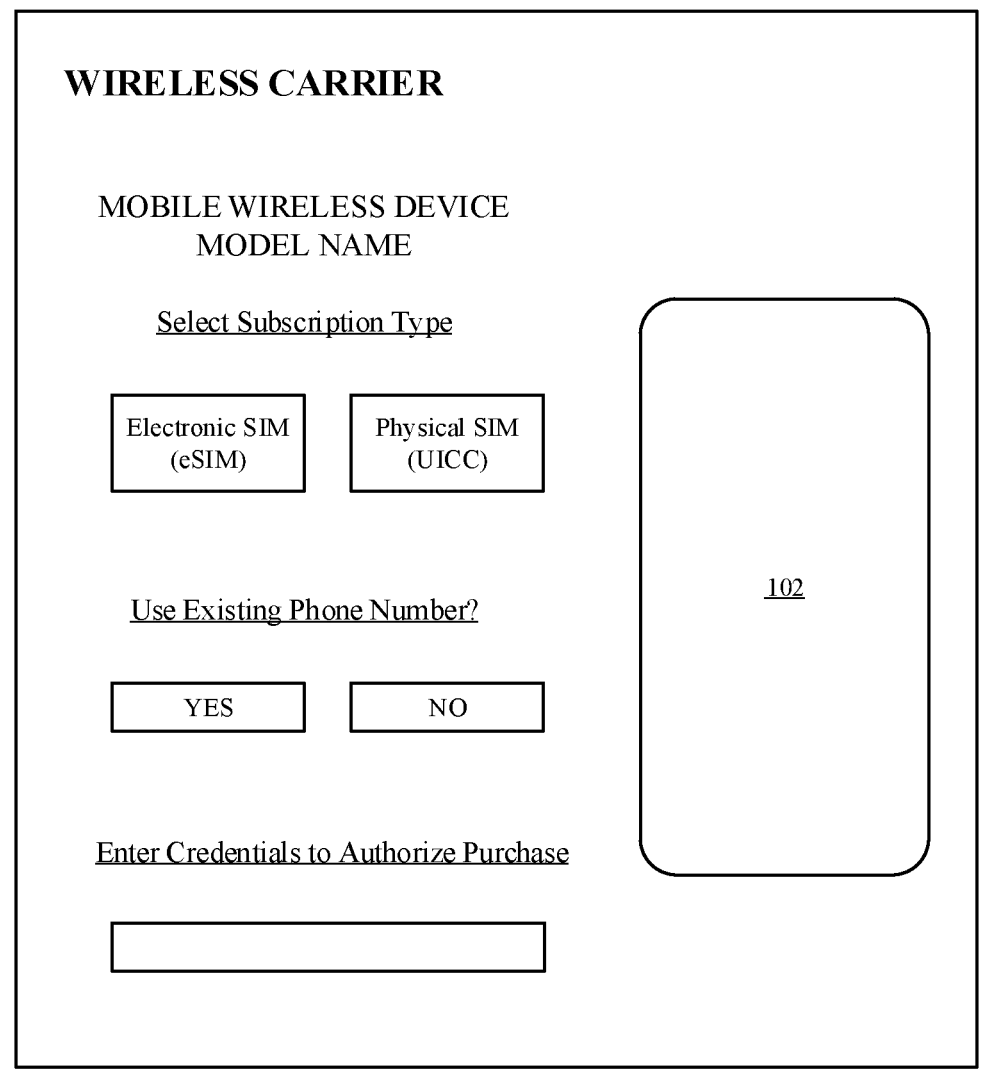
FIG. 3A illustrates an exemplary sales order page including an option for selecting an eSIM subscription for a mobile wireless device, according to some embodiments.

FIG. 3A illustrates a diagram 300 of an exemplary sales order page including an option for selecting an eSIM subscription for a mobile wireless device 102. The eSIM option can be presented along with an option for a physical SIM card (UICC) after a user has selected a particular MNO (wireless carrier) to which to subscribe for access to cellular wireless services for the mobile wireless device 102. The user can purchase the mobile wireless device 102 online via a device manufacturer website, a third party website, an MNO website, or the like. The user can also purchase the mobile wireless device 102 at a retail store, such as provided by the MNO 114, by the device manufacturer, or by a third party. If the user chooses an eSIM option, then the user can also elect to re-use an existing phone number to port with the eSIM 208 to the mobile wireless device 102 being purchased or to use a new phone number. The use can be asked whether they are an existing customer of the MNO 114 or a new customer and applicable user credential information (to verify an existing customer or to onboard a new customer) can be obtained to authorize purchase of the mobile wireless device 102 and/or transfer of a cellular wireless service subscription to the mobile wireless device 102 (e.g., to use with the eSIM 208 option, if selected).

Figure 3B:
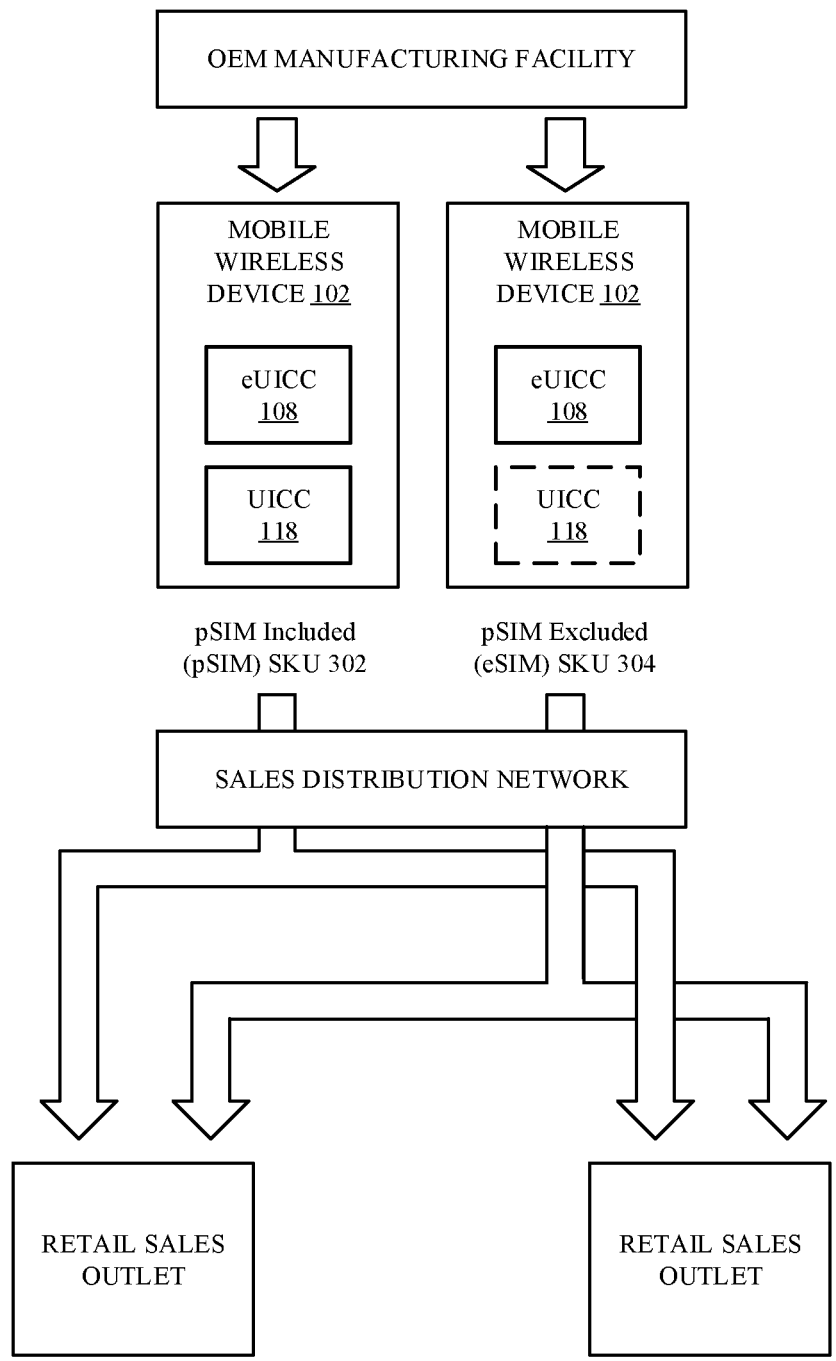
FIG. 3B illustrates an exemplary sales distribution of multiple SKUs for a mobile wireless devices, according to some embodiments.

FIG. 3B illustrates a diagram 350 of a manufacturing, distribution, and sales flow for mobile wireless devices 102 configured for a particular MNO 114. An original equipment manufacturer (OEM) manufacturing facility can assemble mobile wireless devices 102 in a first configuration that includes a pSIM on a UICC 118 (intended for pSIM activation) and uses a first stock keeping unit (SKU) 302 for inventory management and in a second configuration that excludes the pSIM/UICC 118 (intended for eSIM 208 activation) and uses a second SKU 304 for inventory management. The pSIM SKU 302 can correspond to a sales order for a mobile wireless device 102 with a pSIM as a primary SIM, while the eSIM SKU 304 can correspond to a sales order for a mobile wireless device with an eSIM 208 as a primary SIM. This arrangement can require the OEM manufacturing facility, intermediate sales distribution network entities, and individual retail sales outlets (managed by the OEM and/or by the MNO 114) to maintain and manage inventory of the distinct SKUs 302/304 for two types of configurations for the mobile wireless device 102. The distribution of configuration types ordered can vary over time, which results in inventory management inefficiencies to account for the unpredictability and changing customer preferences for the use of a pSIM or an eSIM 208 as a primary SIM. As discussed further herein, manufacturing a single configuration that includes a limited functionality pSIM that can be used to configure the mobile wireless device 102 to use a pSIM or an eSIM 208 as a primary SIM after receipt by a user can improve manufacturing, distribution, and sales channel efficiencies. Mobile wireless devices 102 can be configured for a particular MNO 114 with a limited functionality pSIM programmed for that particular MNO 114 at the OEM manufacturing facility. Depending on customer choice, e.g., at a time of sales order, the limited functionality pSIM can be used to activate a fully functional pSIM (on the UICC 118) or to provision and activate a fully functional eSIM 208 (on an eUICC 108) as a primary SIM on the mobile wireless device 102.

Figure 4B:
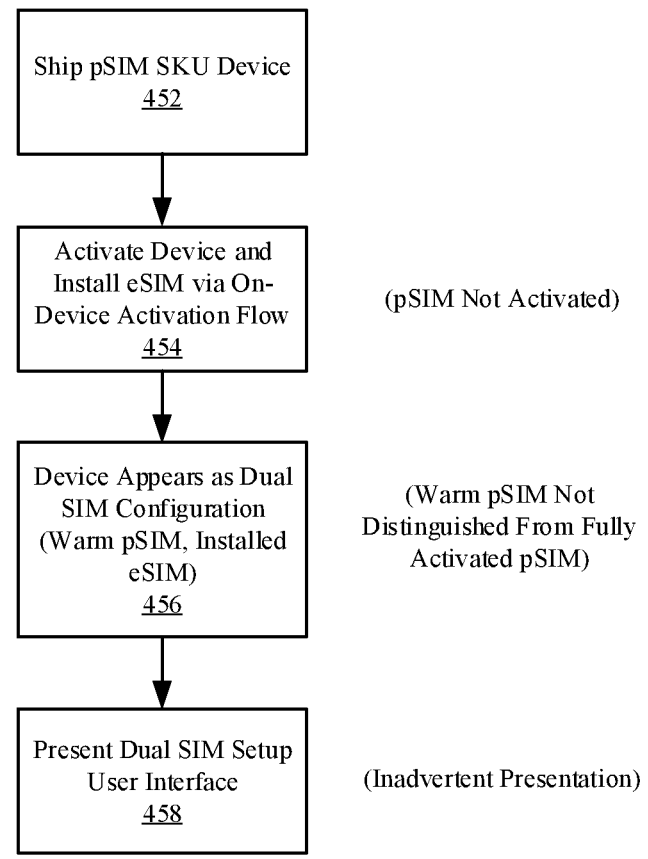
FIG. 4B illustrates an example of an inadvertent dual SIM setup presentation for a mobile wireless device, according to some embodiments.

FIG. 4A illustrates a diagram 400 of a dual SIM setup user interface that can be provided to a user during configuration of a mobile wireless device 102, e.g., to configure multiple, distinct phone lines for different services. Each phone line can be associated with a distinct SIM. When adding a cellular phone line to a mobile wireless device 102, the user can select which of multiple cellular phone lines are used as default lines for different services, such as for voice calling, short message system (SMS) or other messaging applications, additional applications that can access cellular services, cellular data, etc. The user can also choose distinct labels for the different phone lines. The limited functionality pSIM, installed in the mobile wireless device 102 at the time of manufacture, is intended for installation and activation of a fully functional SIM, eSIM 208 or pSIM, as a primary SIM on the mobile wireless device 102. When installing an eSIM 208 as a primary SIM using the limited functionality pSIM during a device activation and configuration process, the mobile wireless device 102 can suppress any dual SIM setup processes, as the combination of the limited functionality pSIM and a fully functional eSIM 208 does not correspond to a dual SIM configuration. Without such suppression, the dual SIM setup process can be inadvertently presented to (and confuse) the user during device activation and configuration as indicated in FIG. 4B.

FIG. 4B illustrates a flowchart 450 of an inadvertent presentation of a dual SIM setup process when configuring a mobile wireless device 102 using a limited functionality pSIM to install and activate an eSIM 208 as a primary SIM. At 452, the mobile wireless device 102 is shipped from an OEM manufacturing facility via a sales distribution network to a retail sales outlet for sale to a user or directly to a user. At 454, after receipt by a user, the mobile wireless device 102 is activated and a fully functional eSIM 208 installed on the mobile wireless device 102 via an on-device activation flow using the limited functionality pSIM to establish a secure cellular connection for authentication and downloading of the eSIM 208. At 456, the mobile wireless device 102 is configured with a limited functionality pSIM, which can also be referred to as a warm pSIM, and a fully functional eSIM 208. This configuration can appear to be a dual SIM configuration when the warm pSIM is not distinguished from a fully functional pSIM. At 458, one or more user interface screens regarding dual SIM setup can be inadvertently presented to a user of the mobile wireless device 102. The user could then erroneously select the limited functionality pSIM rather than the eSIM 208 as part of the dual SIM setup process. To avoid this inadvertent presentation of dual SIM setup and potential resulting error conditions, the mobile wireless device 102 can confirm the presence of a limited functionality pSIM rather than a fully functional pSIM and suppress presentation of the dual SIM setup process on the mobile wireless device 102 during device configuration.

Figure 5A:
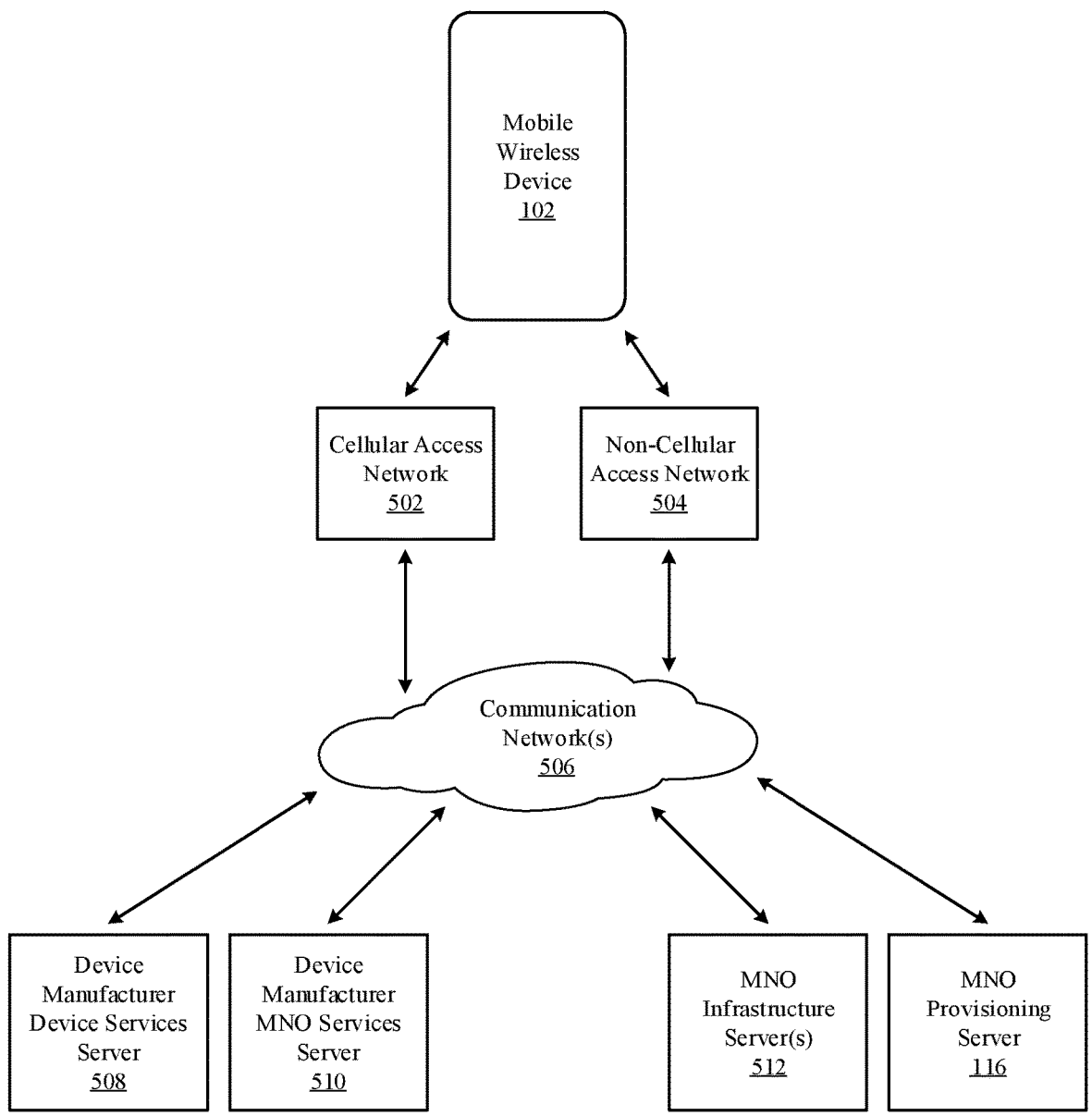
FIG. 5A illustrates an exemplary device activation and provisioning network for a mobile wireless device, according to some embodiments.

FIG. 5A illustrates a diagram 500 of elements of communication network involved in device activation and SIM provisioning, installation, and activation for a mobile wireless device 102. Data connectivity for the mobile wireless device 102 can be required for device activation and SIM provisioning. In some scenarios, a non-cellular access network 504 can be available for the mobile wireless device 102 to connect to various device manufacturer managed and/or MNO 114 managed servers via intervening communication networks 506. In some scenarios, a non-cellular access network 504 may be not available, and the mobile wireless device 102 may rely on access to a cellular access network 502 for activation of the mobile wireless device 102 and for SIM provisioning, e.g., downloading and installation of an eSIM 208, to the mobile wireless device 102. In some embodiments, a limited functionality pSIM can provide access to the cellular access network 502, e.g., when access to a non-cellular access network 504 that can interconnect to the required servers is not available. Rural areas of some countries can have sparse or no availability to non-cellular access networks 504 for activation of the mobile wireless device 102 and/or SIM provisioning. Similarly, certain entities, such as government-managed facilities or private companies can restrict the use of non-cellular access networks 504 for mobile wireless devices 102. Under such scenarios, access to network-based servers for activation and provisioning can require access to a cellular wireless network instead. An OEM manufacturer of the mobile wireless device 102 can maintain multiple network-based servers to assist with management of the mobile wireless device 102, e.g., a device manufacturer managed device services server 508, which can provide management for device manufacturer supplied services to the mobile wireless device 102, and a device manufacturer managed MNO services server 510, which can provide a device manufacturer anchor for management of MNO supplied services to the mobile wireless device 102. An MNO 114 can also provide their own set of servers, including various MNO infrastructure servers 512 for managing cellular access, authentication, authorization, subscription, billing, and other associated management functions for cellular wireless services for the mobile wireless device 102, and MNO provisioning servers 116 from which SIM firmware, e.g., eSIMs 208, OTA updates for eSIMs 208 or pSIMs, etc., can be accessed, with appropriate authentication, by the mobile wireless device 102.

Figure 5B:
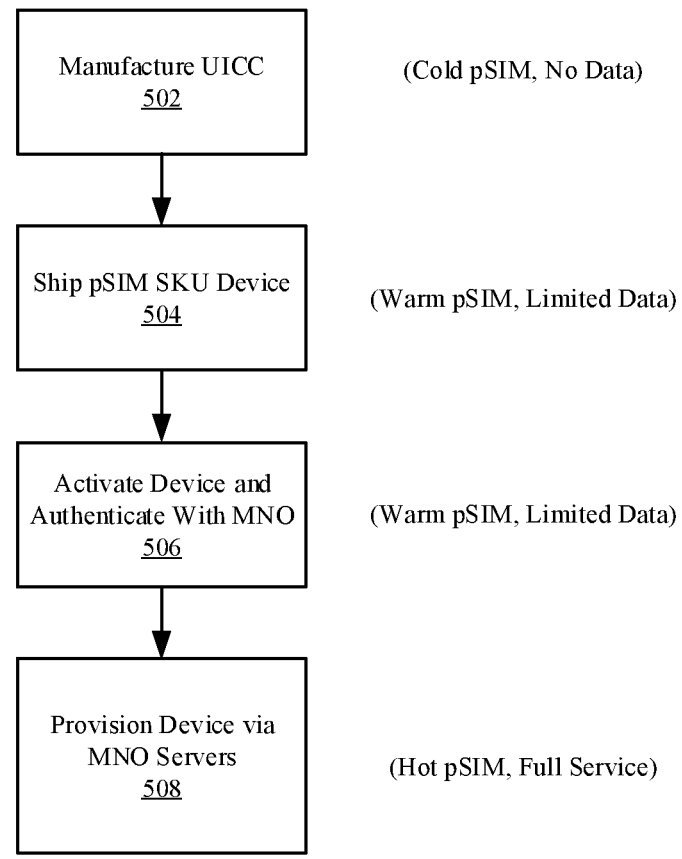
FIG. 5B illustrates an exemplary activation flow for a physical SIM equipped mobile wireless device, according to some embodiments.

FIG. 5B illustrates a diagram 550 of an exemplary activation flow for a physical SIM (pSIM) on a UICC 118 of a mobile wireless device 102. At 502, the UICC 118 can be manufactured with no data access capability available. The UICC 118 in this state can be referred to as a cold pSIM, with no access to data services. At 504, after appropriate configuration, which can include installation of firmware, the UICC 118 can be shipped with a limited functionality pSIM installed thereon. The UICC 118 in this state can be referred to as a warm pSIM, with limited access to specific data services, e.g., only to particular servers or access point names (APNs) and/or only usable for particular functions, such as for downloading, enabling, installing, enabling, or otherwise activating an eSIM 208 for the mobile wireless device 102. At 506, the mobile wireless device 102 can perform an activation process, which can include activating with device manufacturer servers and authenticating with one or more MNO servers using the limited access capability of the warm pSIM to communicate via a cellular access network. At 508, the mobile wireless device 102 can further uses the limited functionality pSIM to provision a fully functional pSIM from an MNO provisioning server 116. The fully functional pSIM, once installed and activated, can be referred to as a hot pSIM, with full access to data and voice services for a subscription to which the user subscribes with the MNO 114.

Figure 6:
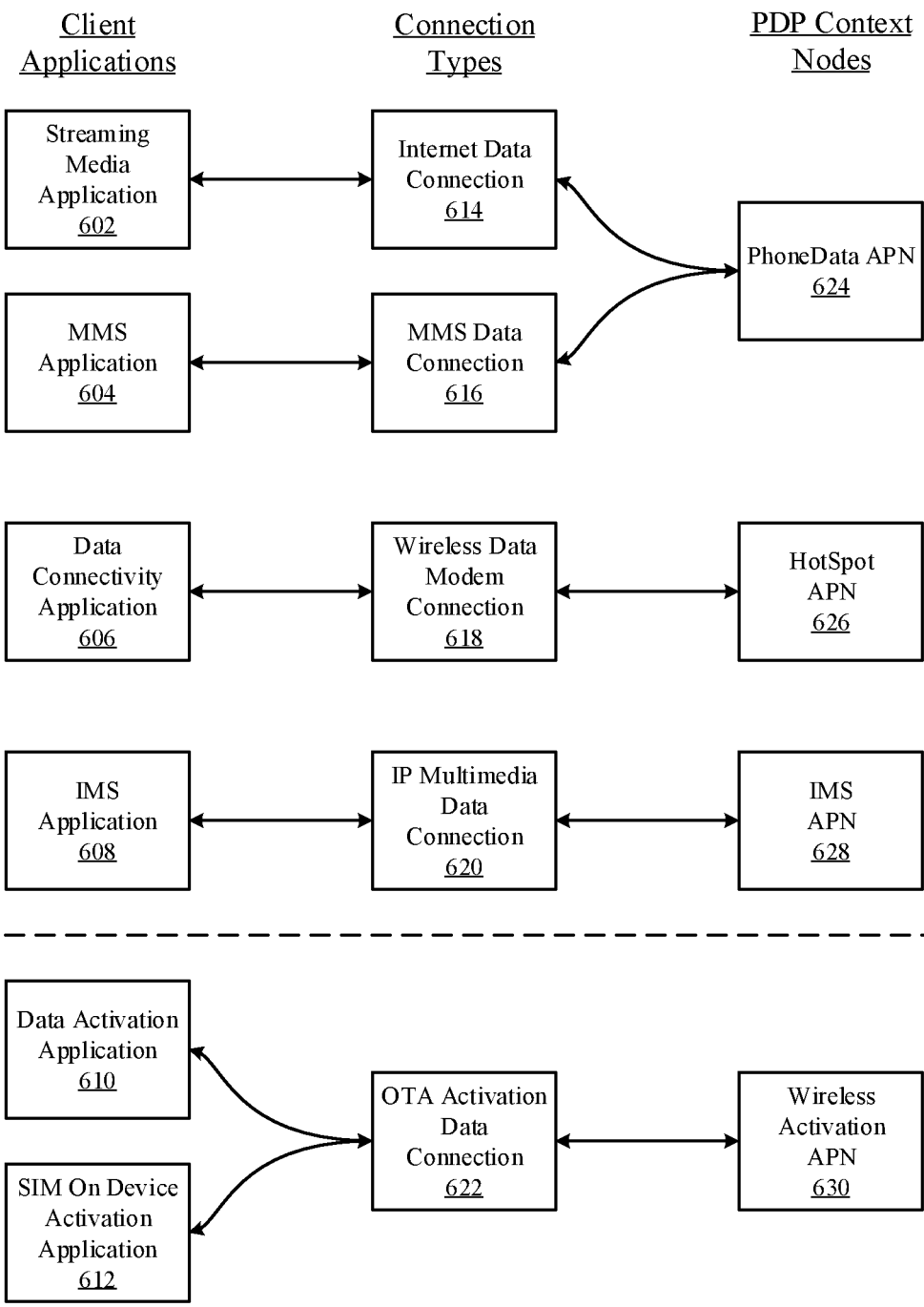
FIG. 6 illustrates exemplary mapping of application data traffic to access point names (APNs) for connectivity of a mobile wireless device, according to some embodiments.

FIG. 6 illustrates a diagram 600 for matching data traffic of different client applications (or client application types) on a mobile wireless device 102 to specific data connection types that interface to particular packet data protocol (PDP) context access point nodes (APNs). Different APNs can have different traffic flow templates that particular application data traffic. Each data connection can have properties configured as applicable to the client application's data requirements. Certain APNs can be available via a cellular wireless connection only while a fully functional SIM is active on the mobile wireless device 102. Example application traffic mappings include a PhoneData APN 624 used for media applications, such as a streaming media application 602 that connects via an Internet data connection 614 and a multimedia messaging service (MMS) application 604 that connects via an MMS data connection 616. Similarly, a HotSpot APN 626 can be used for a data connectivity application 606 to communicate via a wireless data modem connection 618, while an IMS APN 628 can be used for an IMS application 608 to connect via an IP multimedia data connection 620. Access to the above described PDP context nodes can require either a non-cellular connection or a cellular connection via a fully functional SIM (eSIM 208 or pSIM).

A separate wireless activation APN 630 may be available for use via a limited functionality pSIM, such as when a non-cellular wireless connection is not available or a fully functional SIM is not available on the mobile wireless device 102. The wireless activation APN 630 can be used by an operating system (OS) data activation application 610 when activating the mobile wireless device 102 via an over-the-air (OTA) activation data connection 622. The wireless activation APN 630 can further be used by a SIM on-device activation (ODA) application 612 for provisioning and activation of an eSIM 208 as described herein. Connection to the wireless activation APN 630 can be available based on the availability of the limited functionality pSIM in the mobile wireless device 102 prior to activation of a fully functional SIM on the mobile wireless device 102.

Figure 7A:
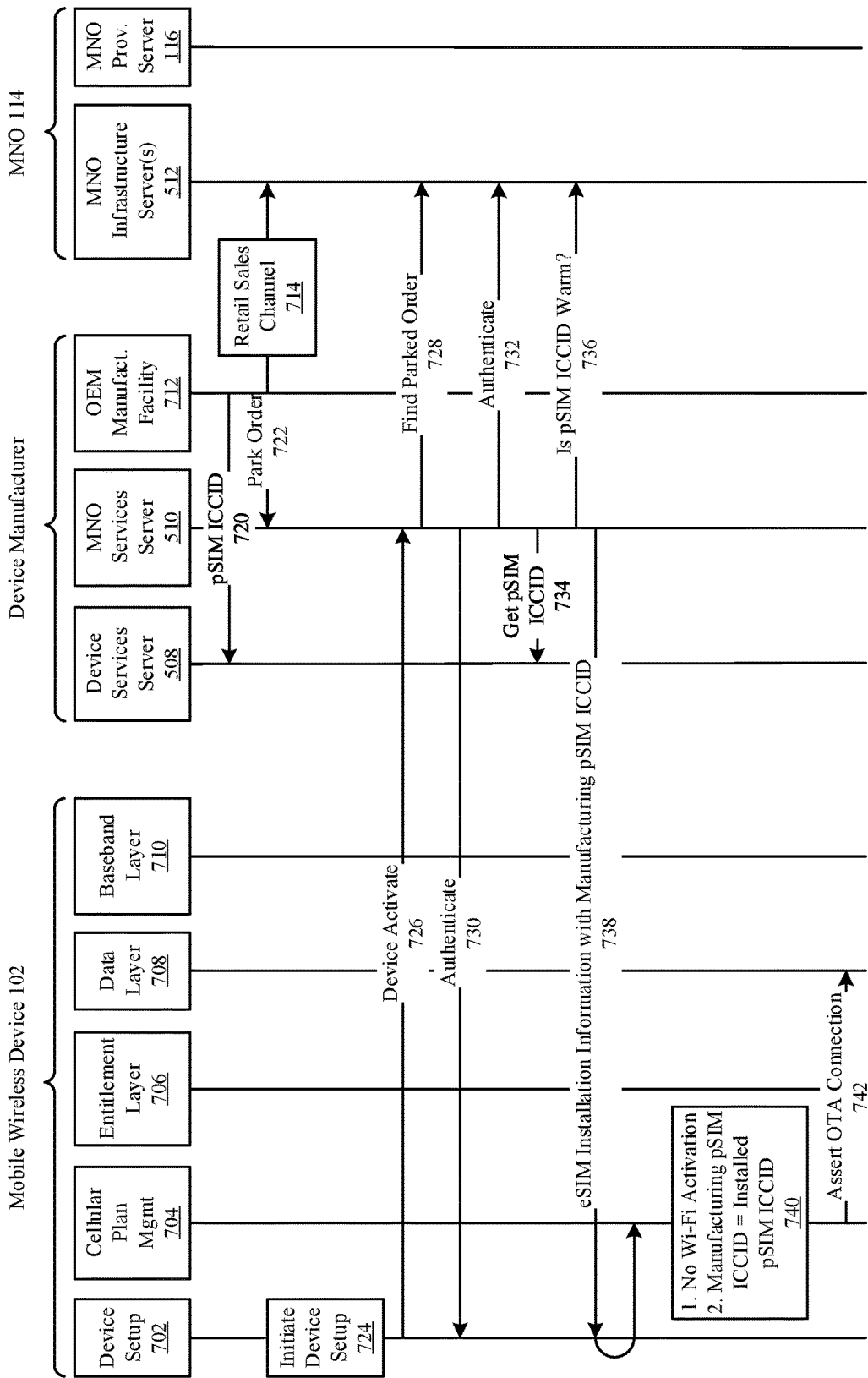
FIGS. 7A, 7B, and 7C illustrate an exemplary sequence of actions performed to provision and activate an eSIM as a primary SIM for a mobile wireless device, according to some embodiments.
Figure 7B:
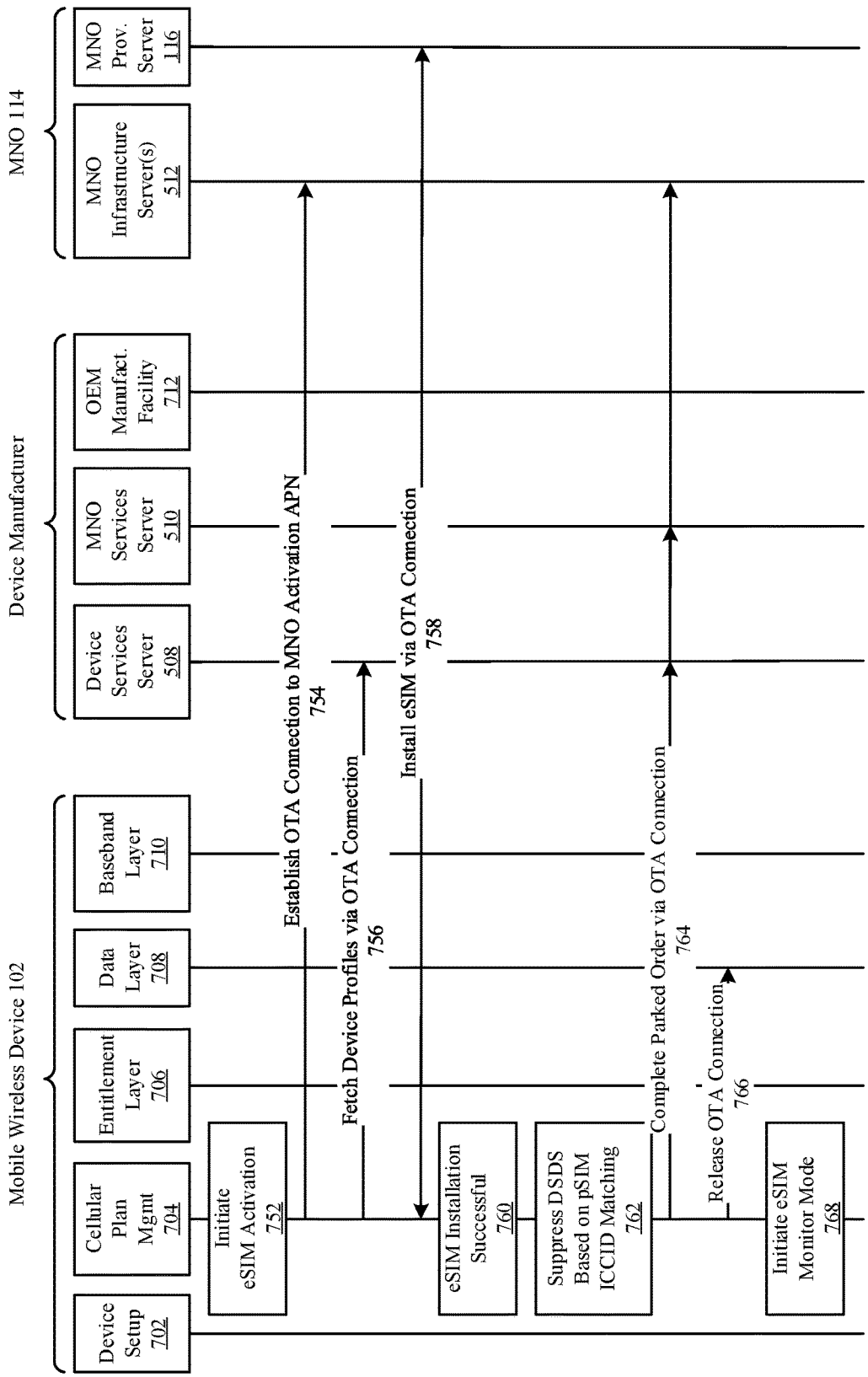
Figure 7C:
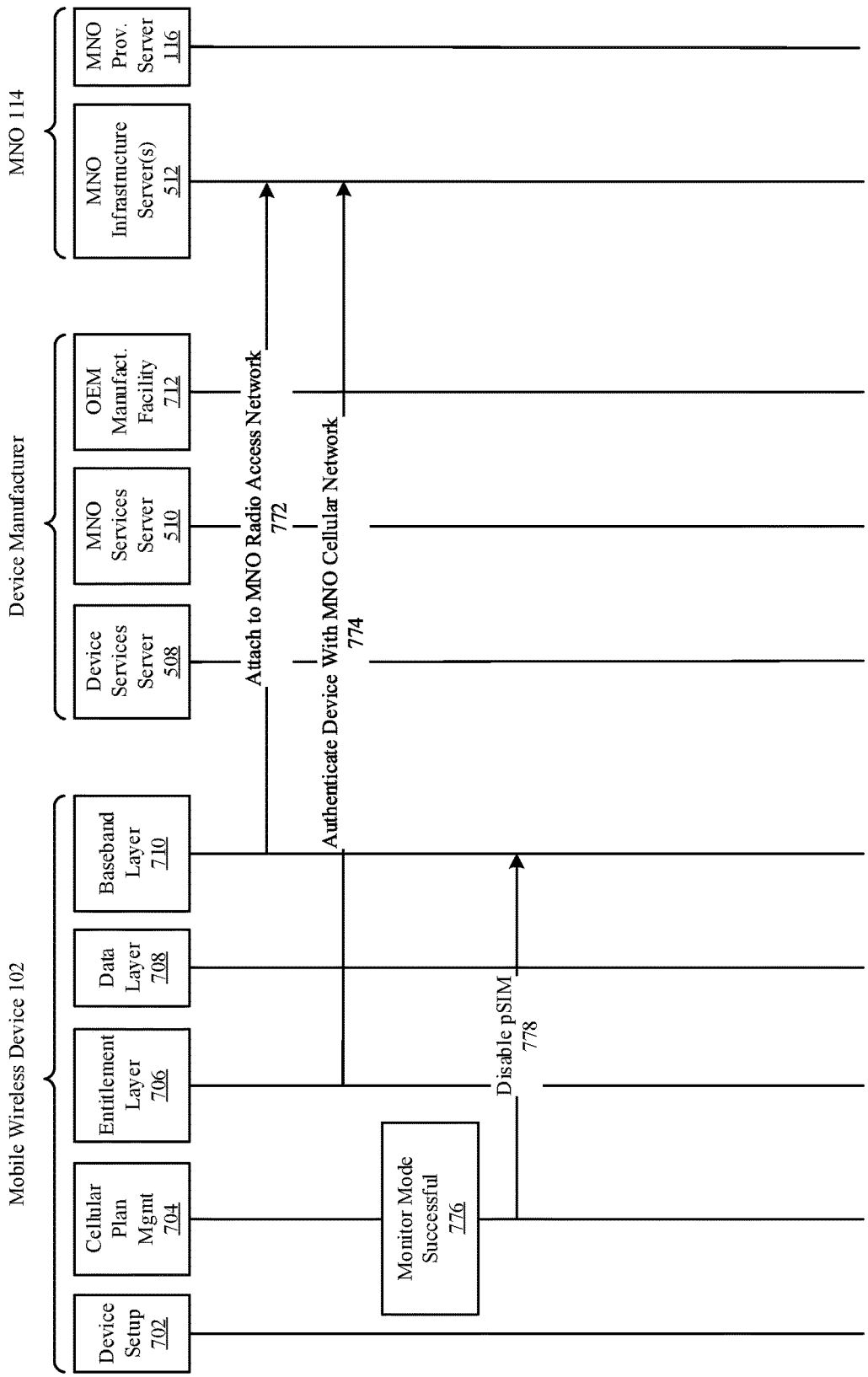

FIGS. 7A, 7B, and 7C illustrate diagrams 700, 750, 770 for activation of an eSIM 208 on a mobile wireless device 102 equipped with a limited functionality pSIM at a time of manufacture. The mobile wireless device 102 can be assembled and packaged at an OEM manufacturing facility 712 to include the limited functionality pSIM. At 720, the OEM manufacturing facility 712 can send a message to a device manufacturer managed device services server 508, the message including an indication of an integrated circuit card identifier (ICCID) value for the limited functionality pSIM included in the mobile wireless device 102. In some embodiments, the limited functionality pSIM is restricted for use to a particular mobile network operator (MNO) 114 (or to a set of associated MNOs 114, such as for virtual MNOs (VMNOs) used by an MNO 114 to offer special services). Subsequently, a user can enter a sales order for purchase of a mobile wireless device 102 to access cellular services of the particular MNO 114. The sales order can include an indication at an eSIM 208 activation option is selected. As a result, subsequently at 722, a retail sales channel 714, e.g., an MNO sales channel or an OEM sales channel, can send a park order message to a device manufacturer managed MNO services server 510, the park order message indicating that the reservation of an eSIM 208 for a mobile wireless device 102. The retail sales channel 714, in some scenarios, can also provide information regarding the sales order to one or more MNO infrastructure servers 512. The park order message can include one or more identifiers associated with the mobile wireless device 102, e.g., an international mobile equipment identifier (IMEI) value, an eUICC 108 identifier (eID) value, a device serial number, an MNO reference number, an eSIM 208 ICCID value, a phone number, a public land mobile network (PLMN) identifier for the MNO 114, etc. After receipt of the mobile wireless device 102, a user, at 724, can initiate setup and activation of the mobile wireless device 102. At 726, a device setup process 702 in the mobile wireless device 102 can send a device activate message to the device manufacturer managed MNO services server 510. Communication with the MNO services server 510 for device activation and authentication can be accomplished using the limited functionality pSIM included in the mobile wireless device 102. In some embodiments, use of the limited functionality pSIM included in the mobile wireless device 102 can be restricted at first to communicating with the MNO services server 510. At 728, the MNO services server 510 can send a find park order message to an MNO infrastructure server 512, where the find parked order message can include one or more identifiers for the mobile wireless device 102, e.g., an IMEI value, an EID value, a device serial number, an MNO reference number, to locate the parked order for the mobile wireless device 102. The MNO infrastructure server can respond with status of the parked order for the mobile wireless device 102. Subsequently, at 730 and 732, the MNO services server 510 can perform an authentication process with the mobile wireless device 102 and with corresponding MNO infrastructure servers 512. At 734, the MNO services server 510 obtains from the device services server 508 the ICCID value for the limited functionality pSIM included in the mobile wireless device at the time of manufacture (previously obtained by the device services server 508 from the OEM manufacturing facility 712). At 736, the MNO services server 510 queries an MNO infrastructure server 512 to determine whether the limited functionality pSIM identified by the ICCID value is in a warm state, i.e., able to be used as a limited functionality pSIM for provisioning and activation of an eSIM 208 for the mobile wireless device 102, or in another state, e.g., not provisioned, already active as a hot SIM, etc. Checking for the status of the pSIM can be based on i) a message, received from an MNO entitlement server, directly or indirectly indicating whether the presently installed pSIM is in a warm state, ii) a protocol handshake with the MNO entitlement server to determine whether the pSIM is a warm SIM, iii) a getAuthentication message, iv) a dedicated (in some scenarios proprietary) application programming interface (API) on the MNO entitlement server that provides information about the pSIM, and/or v) a special "warm" code provided by the MNO entitlement server for the pSIM after authentication at 732 based on credentials from the pSIM succeeds.

In some scenarios, when the MNO entitlement server indicates that the pSIM is in an active (hot) state with full functionality, the eSIM 208 can be installed using the credentials of the active pSIM in a normal flow (not shown). In some scenarios, when the MNO entitlement server indicates the pSIM is in a cold (non-functional) state, a user of the mobile wireless device 102 can be prompted to establish an alternate connection, e.g., via a wireless local area network, as the cold pSIM cannot provide a connection (not shown). When using a fully functional pSIM connection to download and install the eSIM 208, a user interface regarding dual SIM dual standby (DSDS) capability can be allowed (not suppressed) and the pSIM can remain enabled (i.e., not disabled as discussed further herein for the limited functionality pSIM) after installation and activation of the eSIM 208. When using a wireless local area network connection (with no pSIM connection possible) to download and install the eSIM 208, a user interface regarding DSDS capability can be suppressed.

When a response from the MNO infrastructure server indicates the pSIM is in a warm state, the MNO services server 510, at 738, sends a message with eSIM installation information to the mobile wireless device 102, e.g., to the device setup process 702, which forwards the message to a cellular plan management process 704. The message from the MNO services server 510 at 738 can also include the pSIM ICCID value for the limited functionality pSIM installed in the mobile wireless device at the time of manufacture. At 740, the cellular plan management process 704 of the mobile wireless device 102 determines that no non-cellular wireless access is available, e.g., no Wi-Fi network is available for activation, and that the pSIM ICCID for the limited functionality pSIM installed in the mobile wireless device 102 at the time of manufacture matches an ICCID value for the pSIM installed in the mobile wireless device 102. This matching can confirm that the UICC 118 (pSIM card) installed at the time of manufacture has not been replaced by a different pSIM card. When the conditions at 740 are satisfied, the cellular plan management process 704, at 742, can indicate to a data layer process 708 to establish an over-the-air (OTA) cellular wireless connection to use for provisioning and activation of the previously reserved eSIM 208 for the mobile wireless device 102.

At 752, the cellular plan management process 704 can initiate an activation process for the eSIM 208. At 754, the cellular plan management process 704 can establish the OTA connection to a specific MNO activation access point name (APN), the OTA connection established via the data layer process 708 and baseband layer process 710. In some embodiments, the cellular plan management process 704 obtains the MNO activation APN as part of the eSIM installation information received previously from the device manufacturer managed MNO services server 510. At 756, the cellular plan management process 704 obtains from the device manufacturer managed device services server 508 device profiles pending for the mobile wireless device 102 via the established OTA connection. At 758, the cellular plan management process 704 downloads from the MNO provisioning server 116 the eSIM reserved previously for the mobile wireless device 102 based on the sales order. After successful installation of the eSIM concludes at 760, the mobile wireless device 102, at 762, can suppress user interface (UI) processes for dual SIM dual standby (DSDS) configuration based on re-checking that the presently installed pSIM ICCID value matches the previously installed (at the time of manufacture) limited functionality pSIM ICCID value. The limited functionality pSIM (without a fully functional pSIM enabled) plus fully functional eSIM 208 does not provide a DSDS capability. Re-checking that the limited functionality pSIM card is still installed in the mobile wireless device 102 can ensure that suppression of the DSDS UI configuration process is warranted. In some scenarios (not shown) the limited functionality pSIM card may be replaced or upgraded to a fully functional pSIM card. If i) the user of the mobile wireless device 102 replaces the limited functionality pSIM card (UICC 118) with a fully functional pSIM card (UICC 118) or ii) the user of the mobile wireless device 102 updates the limited functionality pSIM card to include a fully functional pSIM, then the DSDS configuration user interface may be presented (not suppressed). At 764, the cellular plan management process 704 sends a message to the device services server 508, via the OTA connection, the message indicating that the parked order for the eSIM 208 has been completed. The device services server 508 can forward the message (or send a similar message) to the MNO services server 510. The MNO services server 510 can forward the message (or send a similar message) to an MNO infrastructure server 512 indicating completion of the parked order for the eSIM 208. At 766, the cellular plan management process 704 indicates to the data layer process 708 to release the OTA connection. In some embodiments, communication of the parked order completion via the OTA connection (at 764) and subsequent release of the OTA connection (at 766) occurs before (or with) suppression of the DSDS UI configuration process (at 760).

As internal processes to propagate completion of the eSIM 208 activation may incur some delay, the cellular plan management process 704 of the mobile wireless device 102, at 768, can initiate a monitor mode to determine when the mobile wireless device 102 can successfully attach to the cellular wireless network of the MNO 114 using the credentials of the installed and activated eSIM 208. At 772, the baseband layer process 710 can successfully attach to the MNO radio access network of the MNO 114. At 774, an entitlement layer process 706 of the mobile wireless device 102 can authenticate with the MNO cellular wireless network. With successful attachment and authentication using credentials of the eSIM 208, the cellular plan management process 704 of the mobile wireless device 102 can conclude, at 776, that the eSIM 208 has been successfully installed and is activated in the MNO's infrastructure network servers 512. As the successfully activated eSIM 208 provides cellular wireless service connectivity for the mobile wireless device 102, the cellular plan management process 704, at 778, can indicate to the baseband layer process 710 to disable the limited functionality pSIM, after which the limited functionality pSIM can be unusable for establishing cellular wireless connections, including limited functionality connections.

Figure 8A:
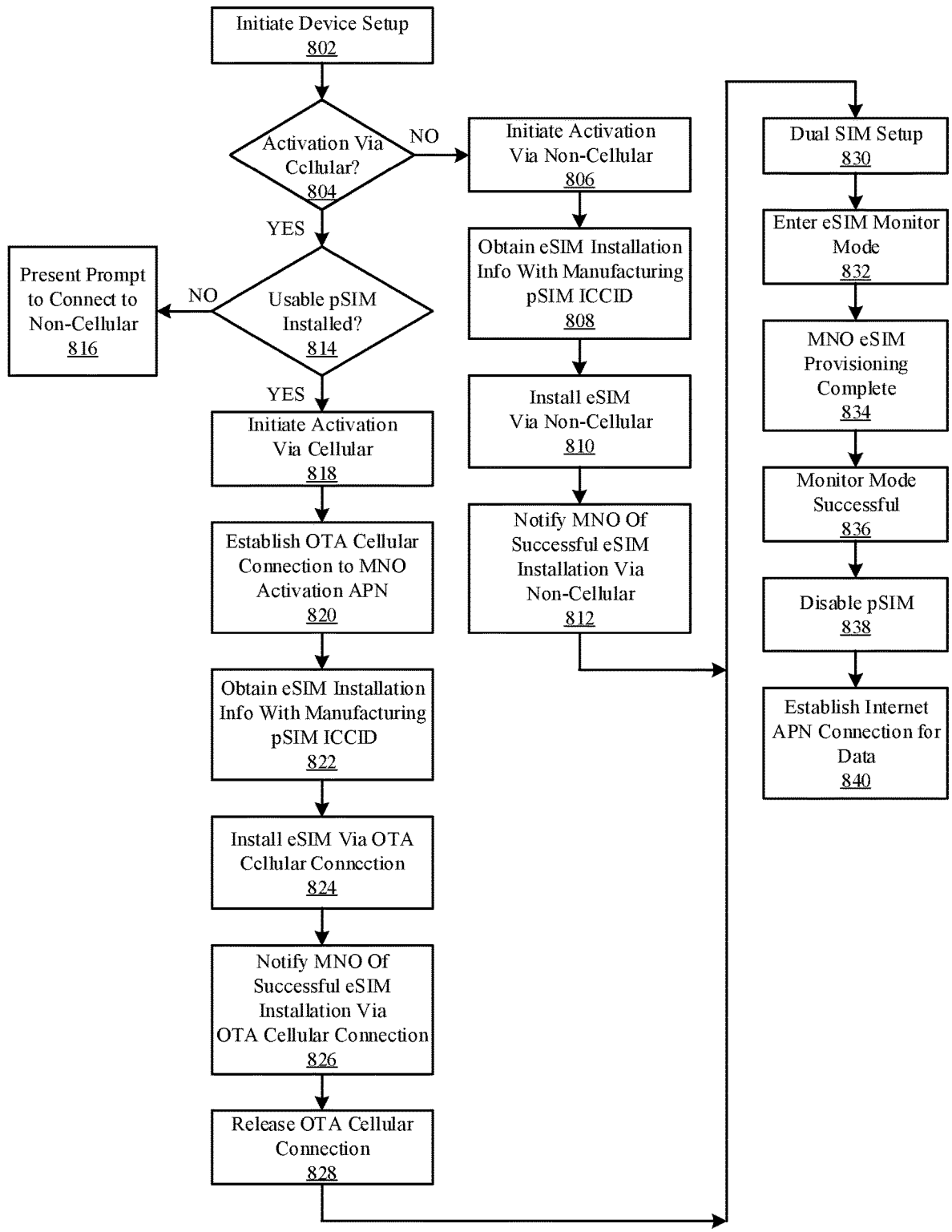
FIGS. 8A and 8B illustrate an exemplary activation flow for an eSIM as a primary SIM for a mobile wireless device, according to some embodiments.
Figure 8B:
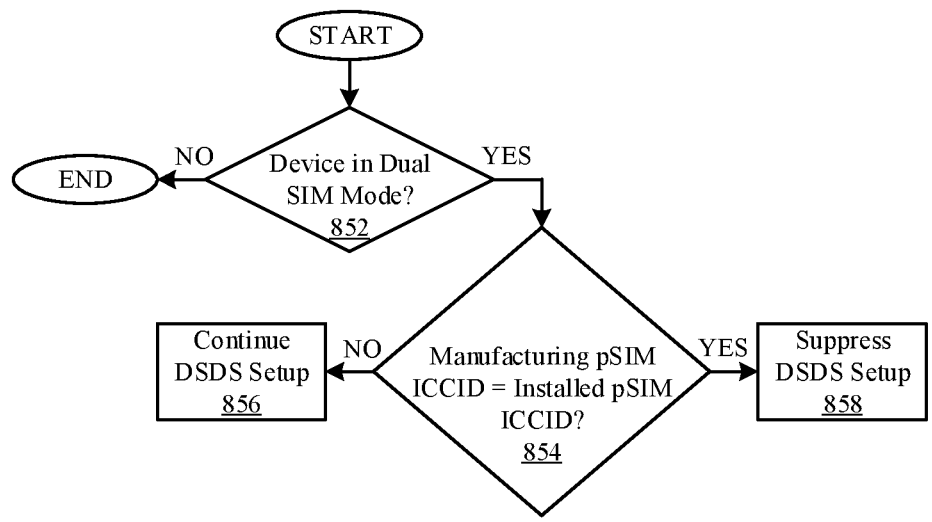
Figure 8B:
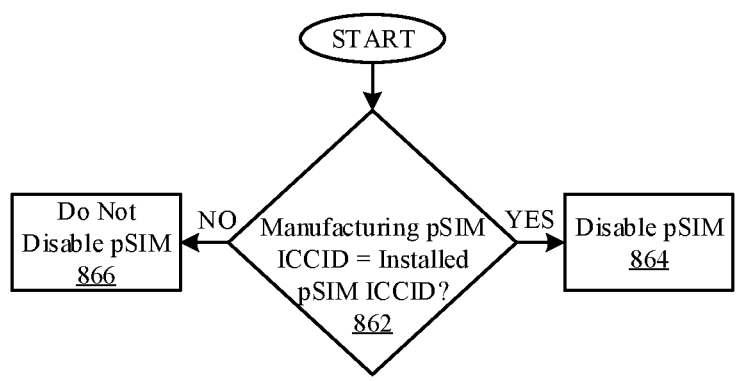

FIGS. 8A and 8B illustrate flowcharts 800, 850, 860 of an exemplary flow for downloading, installing, and activating an eSIM 208 for a mobile wireless device 102 using either a non-cellular wireless capability, when available, or using a cellular wireless capability enabled by a limited functionality pSIM installed in the mobile wireless device 102 at a time of manufacture. At 802, the mobile wireless device 102 initiates a device setup process, which can include installation and configuration of one or more SIMs for the mobile wireless device 102. At 804, the mobile wireless device 102 determines whether activation for a pending SIM, e.g., an eSIM 208, will occur using a cellular wireless connection. Although the mobile wireless device 102 can include a limited functionality pSIM installed at a time of manufacture, the limited functionality pSIM may not be required for activation of an eSIM 208, such as when another communication path can be established.

When a cellular wireless connection will not be used, at 806, the mobile wireless device 102 initiates an eSIM 208 activation process via a non-cellular wireless connection. At 808, the mobile wireless device 102 obtains installation information for an eSIM 208 accompanied by an ICCID value of a pSIM installed in the mobile wireless device 102 at a time of manufacture. At 810, the mobile wireless device 102 downloads and installs the eSIM 208 via the non-cellular wireless connection. At 812 the mobile wireless device 102 sends a notification to an MNO server via the non-cellular connection that installation of the eSIM 208 on the mobile wireless device 102 succeeded.

When a cellular wireless connection will be used, at 814, the mobile wireless device 102 determines, at 814, whether a usable pSIM card (UICC 118) is installed in the mobile wireless device 102 and available to be used for establishing a cellular wireless connection. When no usable pSIM is available, e.g., the pSIM card slot is empty or houses an unusable pSIM card, the mobile wireless device 102, at 816, prompts the user to establish a non-cellular wireless connection to continue with activation of the eSIM 208. When a usable pSIM is available, the mobile wireless device 102, at 818, initiates the eSIM 208 activation process via a cellular wireless connection. At 820, the mobile wireless device establishes an over-the-air (OTA) cellular wireless connection to a specific MNO activation APN associated with the eSIM 208 to be downloaded to the mobile wireless device 102. At 822, the mobile wireless device 102 obtains eSIM installation information from a device manufacturer managed MNO services server 510 accompanied by an ICCID value of a pSIM installed in the mobile wireless device 102 at a time of manufacture. At 824, the mobile wireless device 102 downloads and installs an eSIM 208 to an eUICC 108 included in the mobile wireless device 102 using the OTA cellular wireless connection. At 826, the mobile wireless device 102 notifies the MNO 114, e.g., by sending a message over the OTA connection to the device manufacturer managed MNO services server 510, that the eSIM was successfully installed on the mobile wireless device 102. At 828, the mobile wireless device 102 release the OTA cellular wireless connection.

At 830, the mobile wireless device performs a dual SIM setup process as detailed further by flowchart 850 in FIG. 8B. At 852, the mobile wireless device 102 determines whether the mobile wireless device 102 appears to be in a dual SIM mode, which can include a false detection of a dual SIM mode when a limited functionality pSIM is present in the mobile wireless device 102 with the downloaded and installed eSIM 208. When the mobile wireless device 102 is not in dual SIM mode, the dual SIM setup flow ends (and returns to complete the eSIM activation flow of FIG. 8A). When the mobile wireless device 102 is in dual SIM mode, the mobile wireless device 102, at 854, determines whether the presently installed pSIM ICCID value matches the previously installed (at the time of manufacture) limited functionality pSIM ICCID value, e.g., by comparing the pSIM ICCID value received with the eSIM installation information to the ICCID value of the actual pSIM presently installed in the mobile wireless device 102. The limited functionality pSIM (without a fully functional pSIM enabled) plus fully functional eSIM 208 does not provide a DSDS capability. When the pSIM ICCID values match, the mobile wireless device 102, at 858, bypasses the dual SIM dual standby (DSDS) setup process, e.g., by not presenting DSDS user interface configuration screens. When the pSIM ICCID values do not match, which can indicate that the pSIM card installed in the mobile wireless device 102 is a fully functional pSIM, the mobile wireless device 102 continues, at 856, with the DSDS setup process (the remainder of which is not shown).

Figure 10:
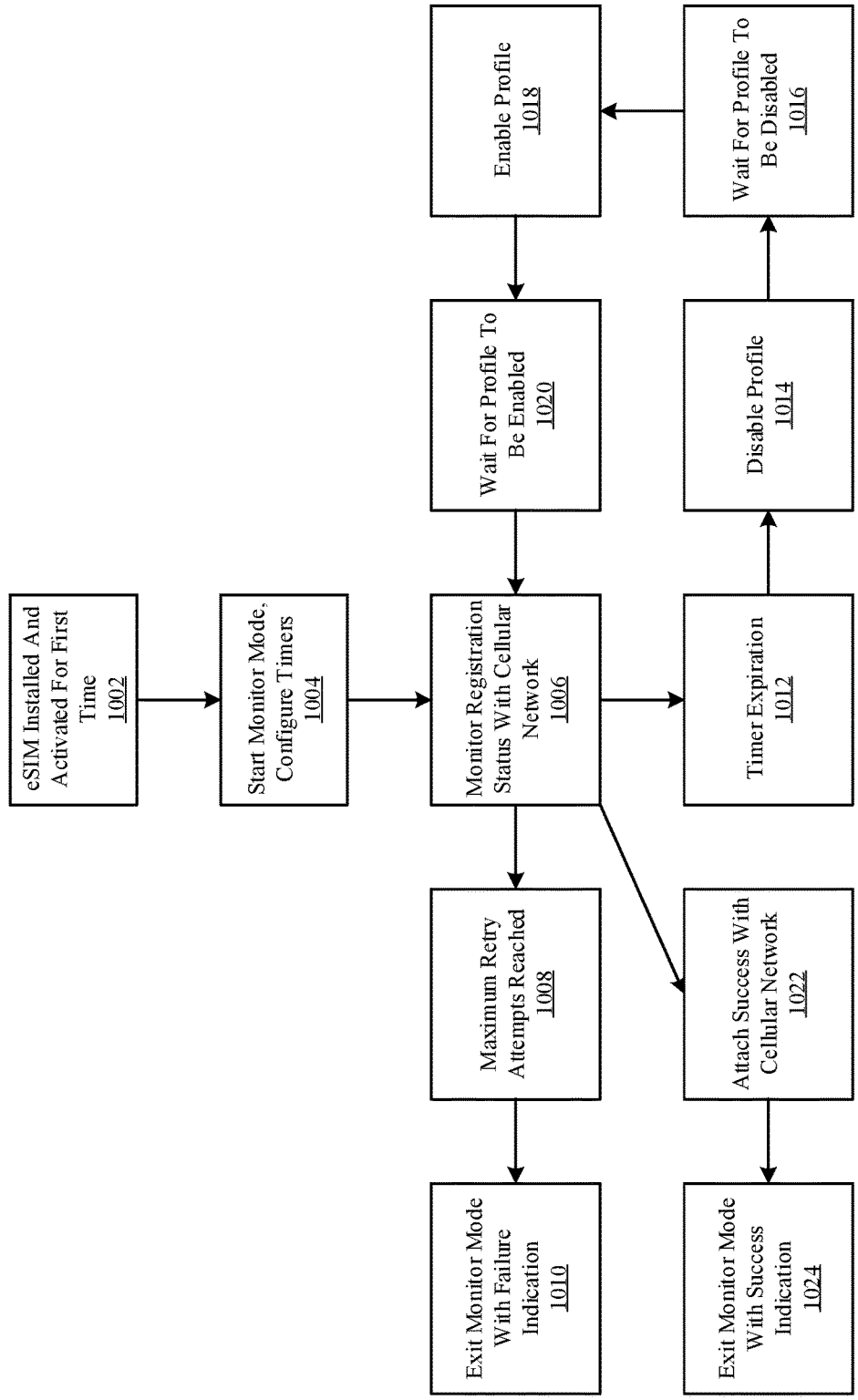
FIG. 10 illustrates an exemplary monitor mode state machine for initial activation of an eSIM for a mobile wireless device, according to some embodiments.

After bypassing or completion of the DSDS setup process, the mobile wireless device 102, at 832, enters an eSIM monitoring mode, which is further detailed in FIG. 10. At 834, the mobile wireless device 102 determines that MNO eSIM back-end provisioning as completed, e.g., by successfully attaching to the cellular wireless network of the MNO 114 using credentials of the installed eSIM 208. At 838, the mobile wireless device 102 executes a pSIM disablement process, as further described by flowchart 860 in FIG. 8B. At 862, the mobile wireless device 102 re-checks whether the presently installed pSIM ICCID value matches the previously installed (at the time of manufacture) limited functionality pSIM ICCID value, e.g., by comparing the pSIM ICCID value received with the eSIM installation information to the ICCID value of the actual pSIM presently installed in the mobile wireless device 102. When the pSIM ICCID values match, the mobile wireless device 102, at 864, disables the pSIM, thereby rendering the pSIM unusable for establishing cellular wireless connections, including limited functionality connections previously provided by the pSIM. When the pSIM ICCID values do not match, the mobile wireless device 102, at 866, refrains from disabling the pSIM, as the pSIM may be a fully functional pSIM installed by the user to replace the limited functionality pSIM after the eSIM installation has successfully completed. After completing the pSIM disablement process, the mobile wireless device 102, at 840, can establish an Internet data connection to an applicable Internet data APN to enable data connectivity for applications resident on the mobile wireless device 102.

Figure 9A:
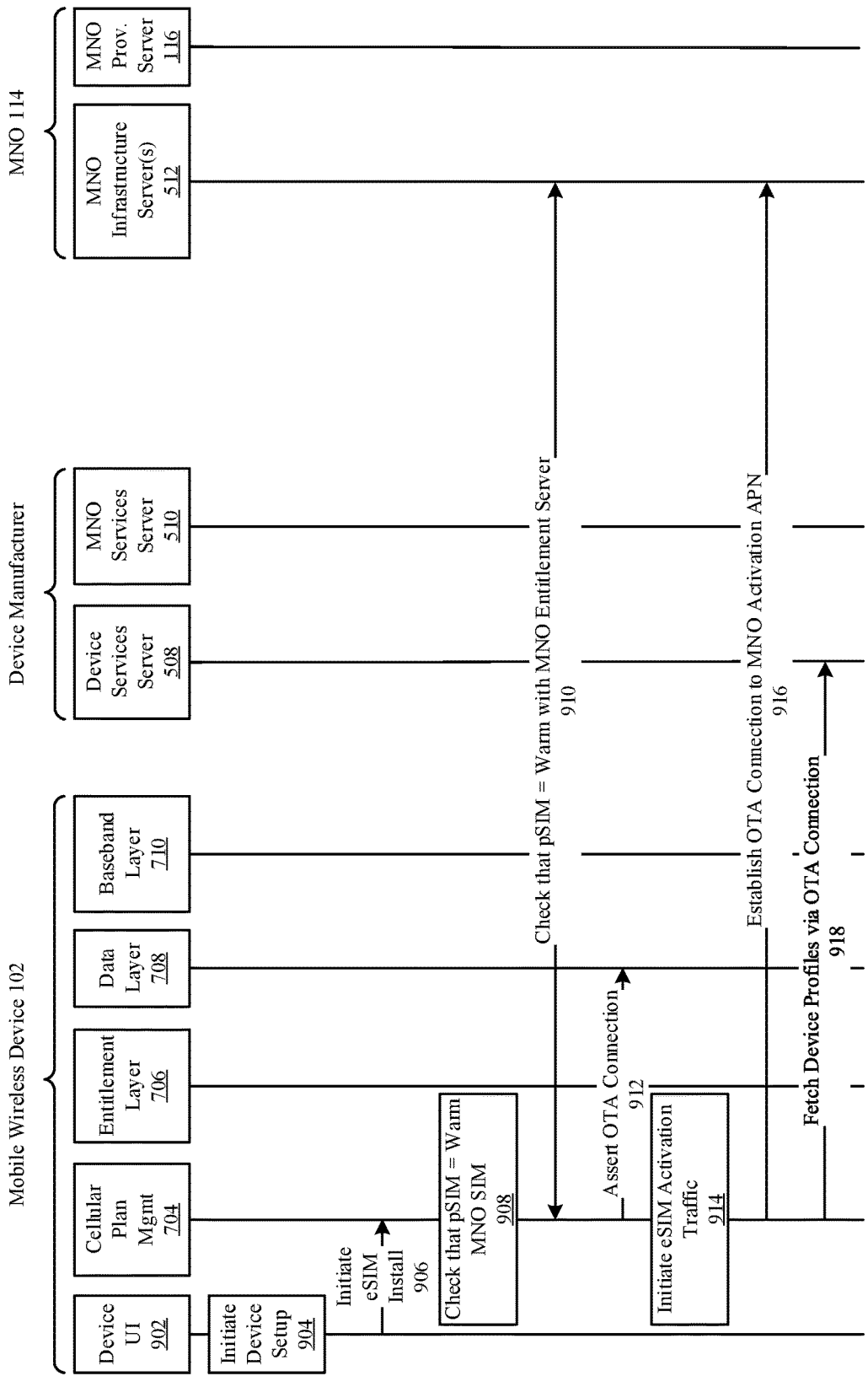
FIGS. 9A and 9B illustrate an alternative exemplary sequence of actions performed to provision and activate an eSIM as a primary SIM for a mobile wireless device, according to some embodiments.
Figure 9B:
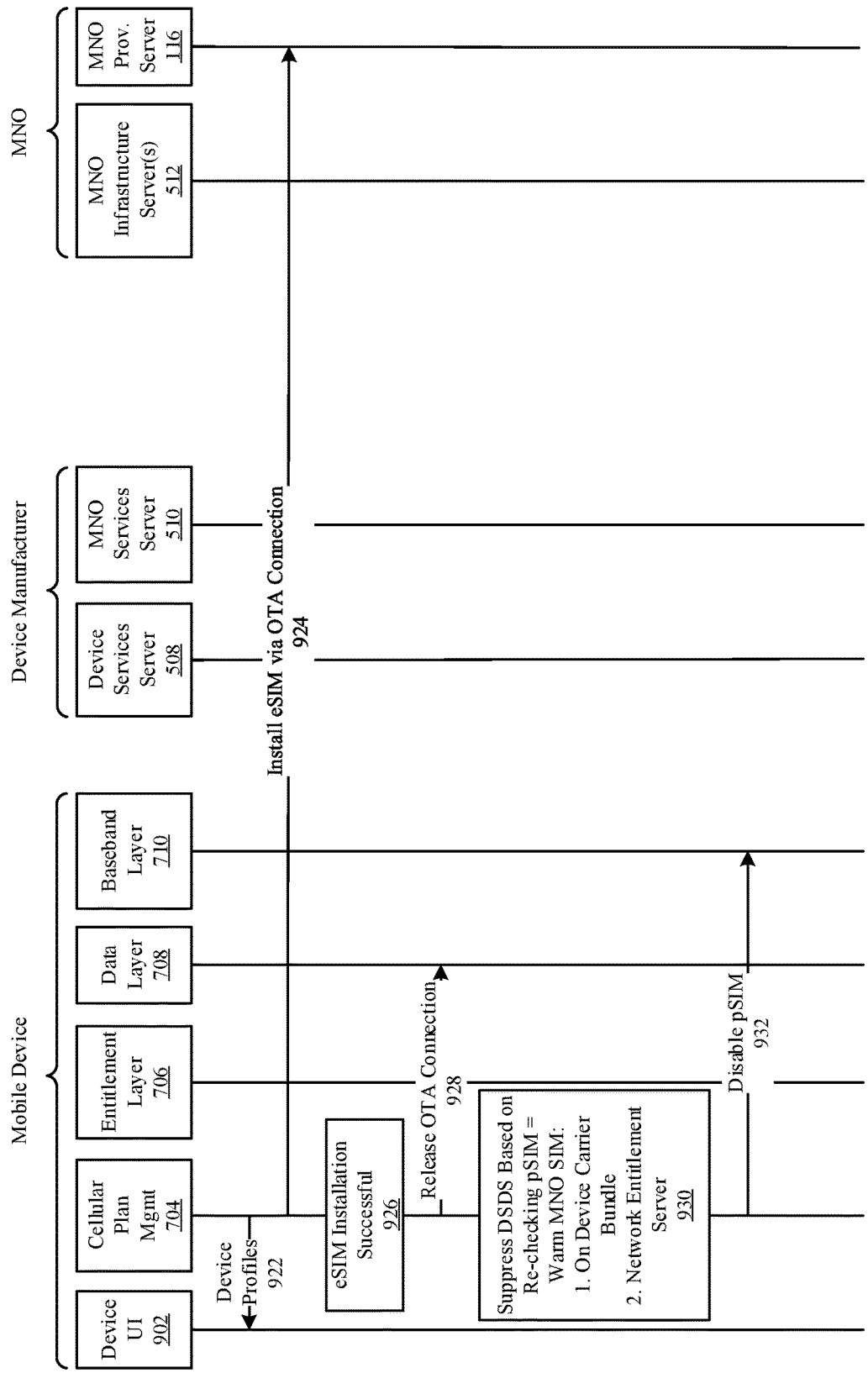

FIGS. 9A and 9B illustrate diagrams 900, 920 for an alternative eSIM provisioning and activation process with a limited functionality pSIM installed in the mobile wireless device 102. The alternative process can be used in some scenarios where the ICCID value of the limited functionality pSIM installed at the time of manufacture is not available. The mobile wireless device 102 can be assembled and packaged at an OEM manufacturing facility 712 to include the limited functionality pSIM. In some embodiments, the limited functionality pSIM is restricted for use to a particular mobile network operator (MNO) 114 or virtual MNO (VMNO), which can be associated with an MNO 114 that manages the physical wireless network. At 904, a user can initiate a setup and configuration process for the mobile wireless device 102, e.g., by interacting by a device user interface (UI) 902. At 906, the device UI 902 indicates to the cellular plan management process 704 to start an installation process for provisioning and installing an eSIM 208 to the mobile wireless device 102. At 908, the cellular plan management process 704 determines whether the pSIM presently installed on the pSIM card (UICC 118) of the mobile wireless device 102 is an MNO SIM in a warm state, i.e., able to be used as a limited functionality pSIM for provisioning and activation of an eSIM 208 for the mobile wireless device 102, or in another state, e.g., not provisioned, already active as a hot SIM, etc. In some embodiments, the cellular plan management process 704, at 908, determines whether the pSIM presently installed is associated with a particular MNO (or VMNO) and based on information in a carrier bundle pre-installed (or downloaded from a device manufacturer managed server) on the mobile wireless device 102 is configured as a limited functionality pSIM. The cellular plan management process 704, at 910, can confirm that the presently installed pSIM is a warm pSIM by querying an entitlement server associated with the particular MNO 114, (where the entitlement server can be one of the MNO infrastructure servers 512). In some embodiments, the MNO entitlement server returns a message that directly or indirectly indicates whether the presently installed pSIM is in a warm state. In some embodiments, the mobile wireless device 102 uses a protocol handshake with the MNO entitlement server to determine whether the pSIM is a warm SIM. In some embodiments, the query and response includes a getAuthentication message. In some embodiments, a dedicated application programming interface (API) on the MNO entitlement server provides information about the pSIM. In some embodiments, a special "warm" code is provided by the entitlement server for the pSIM after authentication using credentials from the pSIM passes. After confirming the warm state status, the cellular plan management process 704, at 912, can indicate to a data layer process 708 to establish an over-the-air (OTA) cellular wireless connection to use for provisioning and activation of an eSIM 208 for the mobile wireless device 102. At 914, the cellular plan management process 704 can initiate an activation process for the eSIM 208. At 916, the cellular plan management process 704 can establish the OTA connection to a specific MNO activation access point name (APN), the OTA connection established via the data layer process 708 and baseband layer process 710. At 918, the cellular plan management process 704 can retrieve, from a device manufacturer managed device services server 508 via the OTA connection, information regarding profiles (e.g., eSIMs 208) pending for the mobile wireless device 102. At 922, the cellular plan management process 704 can provide information regarding the pending profiles for the mobile wireless device 102. In some embodiments, a user selects a profile (eSIM 208) for downloading an installation on the mobile wireless device 102 based on the presented information. At 924, the cellular plan management process 704 downloads and installs an eSIM 208 from an MNO provisioning server 116 via the OTA connection. At 926, the cellular plan management process 704 determines that the eSIM installation was successful, and at 928, the cellular plan management process 704 indicates to the data layer process 708 to release the OTA connection. At 930, the cellular plan management process 704 can suppress UI processes for DSDS configuration based on re-checking that the presently installed pSIM is the warm MNO SIM corresponding to the particular MNO (or VMNO) for which the eSIM 208 was downloaded and installed, e.g., by re-checking information from the carrier bundle on the mobile wireless device 102 using the presently installed pSIM ICCID value, and also be querying the MNO entitlement server again. When the presently installed pSIM is confirmed as the warm MNO SIM for the particular MNO, the cellular plan management process 704 can indicate to the baseband layer process 710 to disable the pSIM.

Figure 9C:
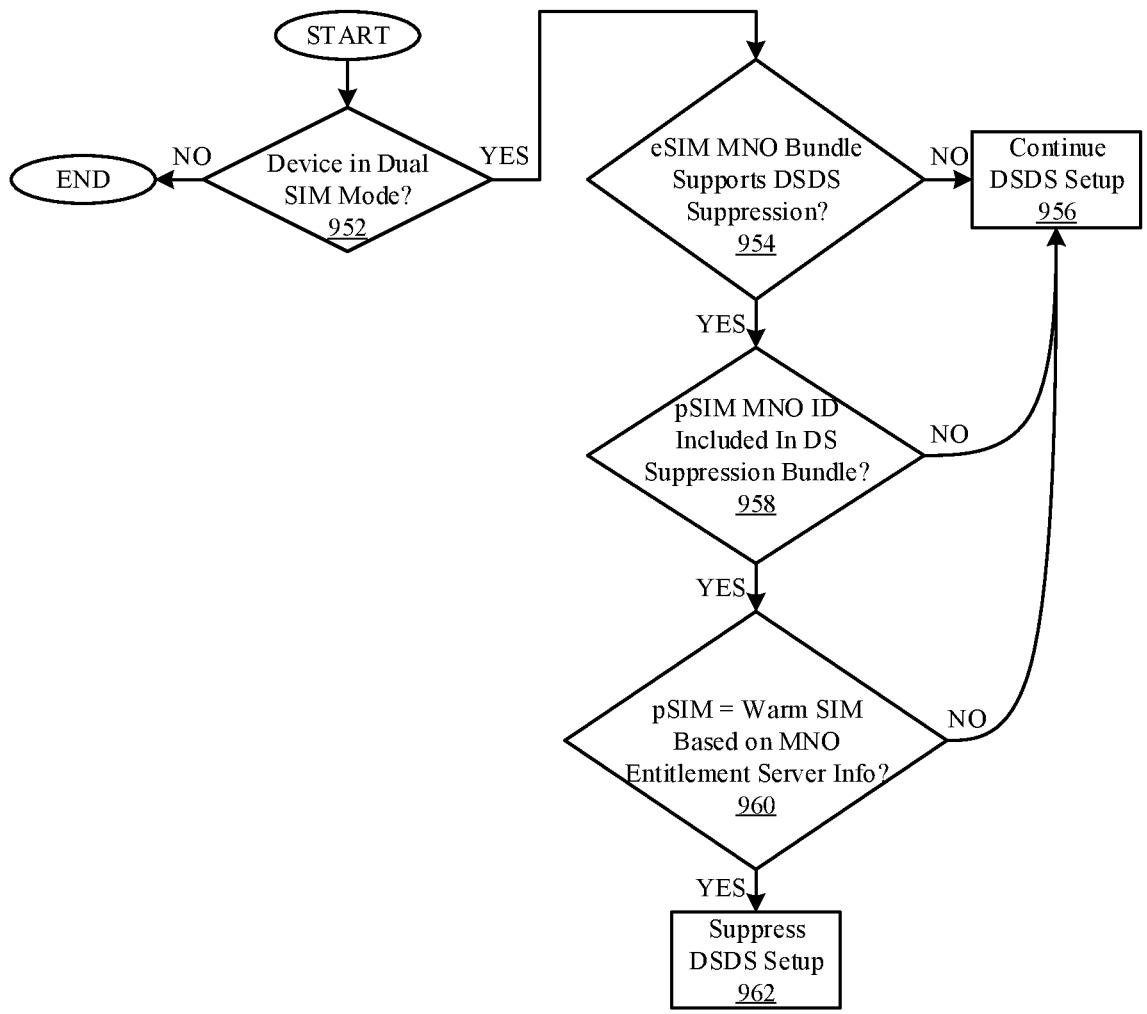
FIG. 9C illustrates a dual SIM setup flow for the alternative eSIM activation process shown in FIGS. 9A and 9B, according to some embodiments.

FIG. 9C illustrates a diagram 950 of an alternative dual SIM, dual standby (DSDS) setup process that can be used to control whether suppression of the DSDS process should occur. At 952, the mobile wireless device 102 determines whether the mobile wireless device 102 appears to be in a dual SIM mode, which can include a false detection of a dual SIM mode when a limited functionality pSIM is present in the mobile wireless device 102 with the downloaded and installed eSIM 208. When the mobile wireless device 102 is not in dual SIM mode, the dual SIM setup flow ends. When the mobile wireless device 102 is in dual SIM mode, the mobile wireless device 102, determines whether several conditions are satisfied to suppress the DSDS setup process. At 954, the mobile wireless device 102 determines whether DSDS suppression is supported based on information in the eSIM MNO carrier bundle. At 958, the mobile wireless device 102 determines, whether the MNO identified by the presently installed pSIM ICCID is included in a set of DSDS suppression carrier bundle identifiers pre-loaded (or downloaded from a device manufacturer managed server) on the mobile wireless device 102. At 960, the mobile wireless device 102 determines (by re-checking with the MNO entitlement server for the MNO identified by the presently installed pSIM's ICCID value) whether the pSIM is a warm pSIM. Re-checking can be based on i) a message, received from the MNO entitlement server, directly or indirectly indicating whether the presently installed pSIM is in a warm state, ii) a protocol handshake with the MNO entitlement server to determine whether the pSIM is a warm SIM, iii) a getAuthentication message, iv) a dedicated application programming interface (API) on the MNO entitlement server provides information about the pSIM, and/or v) a special "warm" code provided by the entitlement server for the pSIM after authentication using credentials from the pSIM passes. When any one or more of the conditions at 954, 958, and 960 are not satisfied, the DSDS setup process continues at 956 (remainder of which is not shown). When all conditions at 954, 958, and 960 are satisfied, the mobile wireless device 102 at 962 suppresses presentation of the DSDS setup process.

FIG. 10 illustrates a diagram 1000 of an exemplary monitor mode state machine for initial activation of an eSIM 208 for a mobile wireless device 102. At 1002, an eSIM 208 is installed and activated for a first time on a mobile wireless device 102. At 1004, the mobile wireless device 102 initiates the monitor mode state machine and configures one or more timers. At 1006, the mobile wireless device 102 monitors registration status for the mobile wireless device 102 to determine whether the mobile wireless device 102 has successfully attached to an MNO cellular wireless network associated with the newly installed eSIM 208. Activation of the eSIM 208 in all applicable servers of an infrastructure network of the MNO 114 may require some time to complete, and as such attachment to an access portion of the MNO cellular wireless network cannot be guaranteed to succeed immediately after completion of installation of the eSIM 208 at the mobile wireless device 102. At 1006, the mobile wireless device 102 can attempt to attach to an access portion of the MNO cellular wireless network. Successful attachment to the MNO cellular wireless network, indicated at 1022, causes the mobile wireless device 102 to exit the monitor mode with an attachment success indication at 1024. Attachment failure at 1006 causes the mobile wireless device 102 to remain in a monitor mode and upon expiration of a timer at 1012, the mobile wireless device 102 disables the eSIM (profile) 208 at 1014, waits for disablement of the eSIM (profile) 208 to complete at 1016, subsequently re-enables the eSIM (profile) 208 at 1018, and then waits for enablement of the eSIM (profile) 208 to complete at 1020 before re-attempting attachment of the mobile wireless device 102 to the MNO cellular wireless network again at 1006. When the mobile wireless device 102 has re-attempted attachment to the MNO cellular wireless network multiple times, and a maximum number of retry attempts is reached at 1008, the mobile wireless device 102 exits monitor mode with a failure indication at 1010. In some embodiments, the mobile wireless device 102 provides an indication of attachment success and/or attachment failure, such as via a display of the mobile wireless device 102.

The monitor mode state machine illustrated in FIG. 10 can compensate for propagation delay between when an eSIM 208 completes installation on a mobile wireless device 102 and when the MNO cellular wireless network completes activation of the newly installed eSIM 208 (and deactivation of a previous eSIM 208 if applicable). The device manufacturer managed MNO services server 510, at 764 in FIG. 7B, indicates to the MNO infrastructure server 512 that the eSIM installation is complete (and therefore the mobile wireless device 102 can assume that the eSIM 208 is ready for use); however, propagation of the eSIM installation completion throughout the MNO cellular wireless network can take some matter of tens of seconds or up to several minutes depending on network loading. Attempting to attach to an access portion of the MNO cellular wireless network by the mobile wireless device 102 before propagation of the eSIM activation completes can result in a non-access stratum (NAS) signaling message indicating a fatal rejection cause. As specifications for NAS signaling published by the $3^{rd}$ Generation Partnership Project (3GPP) can disallow re-attachment by a mobile wireless device 102 to the MNO cellular wireless network using the same credentials from the eSIM 208 unless the mobile wireless device 102 is rebooted (or in the case of a physical SIM card, after the SIM card is removed and re-inserted into the mobile wireless device 102). Reboot of the mobile wireless device 102, however, cannot occur in the midst of a device activation process as described herein. Similar to SIM re-insertion, the mobile wireless device 102 can disable and then subsequently re-enable the eSIM 208, repeating as needed with back-off timers to delay each attempt until successful attachment occurs or a maximum number of retries is reached.

Figure 11:
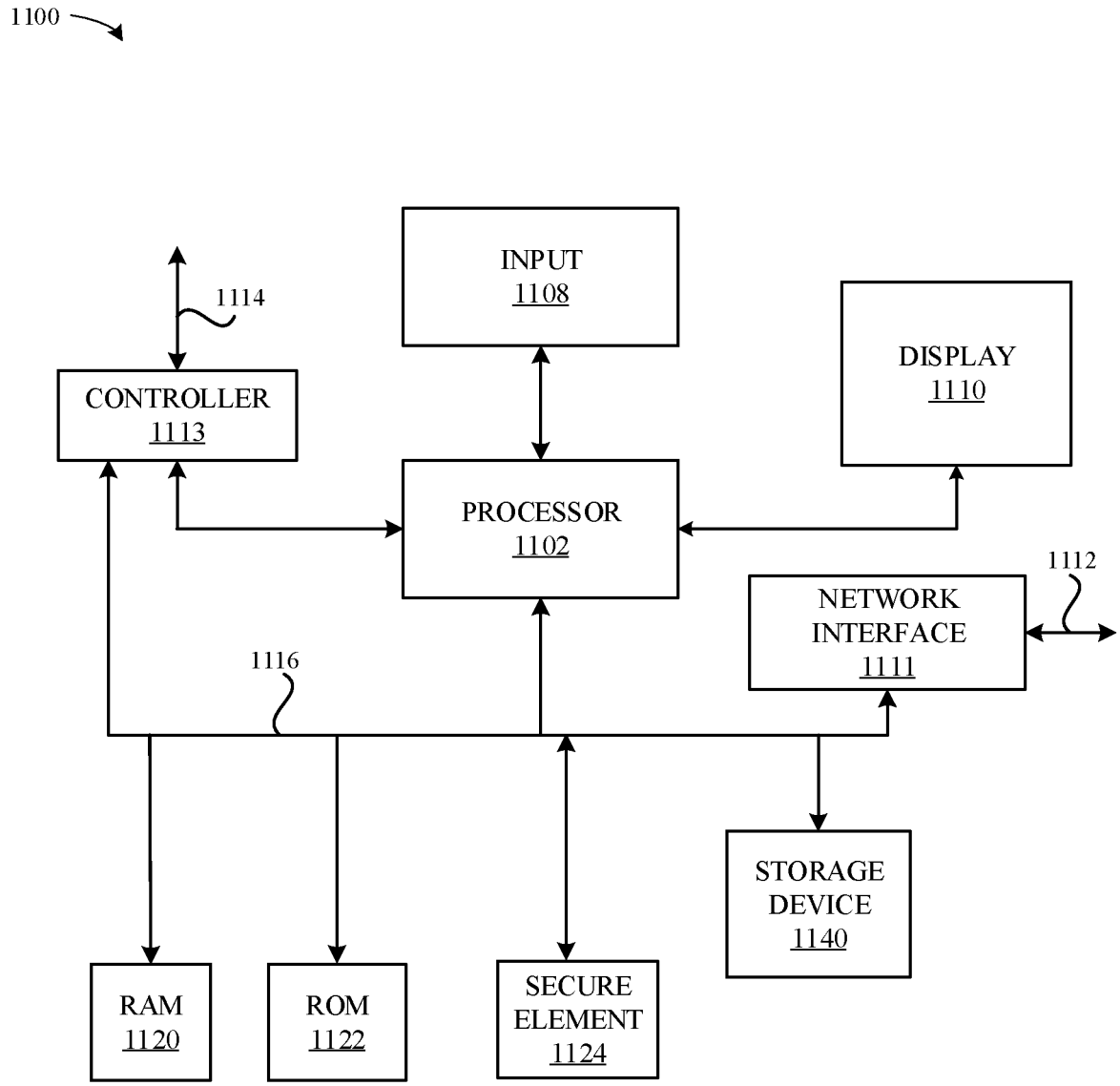
FIG. 11 illustrates a block diagram of exemplary elements of a mobile wireless device, according to some embodiments.

FIG. 11 illustrates a detailed view of a representative computing device 1100 that can be used to implement various methods described herein, according to some embodiments. In particular, the detailed view illustrates various components that can be included in the mobile wireless device 102. As shown in FIG. 11, the computing device 1100 can include a processor 1102 that represents a microprocessor or controller for controlling the overall operation of computing device 1100. The computing device 1100 can also include a user input device 1108 that allows a user of the computing device 1100 to interact with the computing device 1100. For example, the user input device 1108 can take a variety of forms, such as a button, keypad, dial, touch screen, audio input interface, visual/image capture input interface, input in the form of sensor data, etc. Still further, the computing device 1100 can include a display 1110 that can be controlled by the processor 1102 to display information to the user. A data bus 1116 can facilitate data transfer between at least a storage device 1140, the processor 1102, and a controller 1113. The controller 1113 can be used to interface with and control different equipment through an equipment control bus 1114. The computing device 1100 can also include a network/bus interface 1111 that communicatively couples to a data link 1112. In the case of a wireless connection, the network/bus interface 1111 can include a wireless transceiver.

The computing device 1100 also includes a storage device 1140, which can comprise a single disk or a plurality of disks (e.g., hard drives), and includes a storage management module that manages one or more partitions within the storage device 1140. In some embodiments, storage device 1140 can include flash memory, semiconductor (solid state) memory or the like. The computing device 1100 can also include a Random Access Memory (RAM) 1120 and a Read-Only Memory (ROM) 1122. The ROM 1122 can store programs, utilities or processes to be executed in a non-volatile manner. The RAM 1120 can provide volatile data storage, and stores instructions related to the operation of the computing device 1100. The computing device 1100 can further include a secure element (SE) 1124, which can represent secure storage for cellular wireless system access by the mobile wireless device 102, such as an eUICC 108 on which to store one or more eSIMs 208 and/or a UICC 118 on which to store a pSIM.

Representative Embodiments

In some embodiments, a method for installing and activating an electronic Subscriber Identity Module (eSIM) 208 for access to services of a mobile network operator (MNO) 114 by a mobile wireless device 102 includes the mobile wireless device 102: i) sending, to a network-based server 510, a request activation message to initiate eSIM installation and activation; ii) receiving, from the network-based server 510, responsive to successful authentication of a user of the mobile wireless device 102, an eSIM installation message indicating the eSIM 208 reserved for the mobile wireless device 102 and a first ICCID value for a physical SIM (pSIM) installed in the mobile wireless device 102 at a time of manufacture; iii) determining whether the first ICCID value matches a second ICCID value of a pSIM included in the mobile wireless device 102; and when a) the first ICCID value matches the ICCID value of the pSIM included in the mobile wireless device 102, and b) a non-cellular connection is unavailable and cannot be established for provisioning and activation of the eSIM 208: iv) establishing a secure over-the-air (OTA) cellular connection to an MNO provisioning server 116 associated with the eSIM 208 via a limited functionality of the pSIM; v) obtaining, via the secure OTA cellular connection, the eSIM 208 from the MNO provisioning server 116; vi) installing the eSIM 208 on an embedded universal integrated circuit card (eUICC) 108 of the mobile wireless device 102; and vii) sending, to the MNO provisioning server 116, an indication of successful installation of the eSIM 208 on the eUICC 108 of the mobile wireless device 102.

In some embodiments, the secure OTA cellular connection includes an access point name (APN) reserved for activation of SIMs associated with an MNO 114 associated with the mobile wireless device 102. In some embodiments, the method further includes the mobile wireless device 102, after i) successful installation of the eSIM 208 on the eUICC 108 and ii) after successful attachment to cellular wireless network of the MNO 114 via the eSIM 208, disabling the pSIM included in the mobile wireless device 102. In some embodiments, disabling the pSIM includes rendering the pSIM unusable for establishing cellular connections. In some embodiments, the method further includes the mobile wireless device 102, after successful installation of the eSIM 208 on the eUICC 103, bypassing presentation of a dual SIM setup process when the first ICCID value matches the second ICCID value of the pSIM included in the mobile wireless device 102. In some embodiments, the eSIM installation message includes a network address for the MNO provisioning server 116 from which to download the eSIM 208. In some embodiments, the method further includes the mobile wireless device, when i) the first ICCID value does not match the second ICCID value of the pSIM included in the mobile wireless device 102 or ii) a non-cellular connection can be established for provisioning and activation of the eSIM 208, presenting a prompt to a user of the mobile wireless device 102 to establish the non-cellular connection, and subsequently obtaining and installing the eSIM 208 via the non-cellular connection.

In some embodiments, a method for subscription activation of an electronic Subscriber Identity Module (eSIM) 208 for a mobile wireless device 102 includes one or more network-based servers 508, 510: i) receiving, from an original equipment manufacturer (OEM) manufacturing facility 712, a first integrated circuit card identifier (ICCID) value for a physical subscriber identity module (pSIM) installed in the mobile wireless device 102 at a time of manufacture, the pSIM associated with a particular mobile network operator (MNO) 114; ii) receiving, from retail sales channel 714 associated with the particular MNO 114, a park order message indicating an eSIM 208 reserved for the mobile wireless device 102, the eSIM 208 associated with a second ICCID value; iii) receiving, from the mobile wireless device 102, a request activation message after receipt of the park order message; iv) querying an entitlement server 512 of the particular MNO 114 to determine whether the first ICCID value for the pSIM installed in the mobile wireless device 102 at the time of manufacture indicates a warm SIM usable for eSIM activation; v) sending, to the mobile wireless device 102 after determining the pSIM is the warm SIM, an eSIM installation message indicating the eSIM 208 reserved for the mobile wireless device 102 and the first ICCID value for the pSIM; vi) receiving, from the mobile wireless device 102, an indication of successful installation of the eSIM 208 on an embedded universal integrated circuit card (eUICC) 108 of the mobile wireless device 102; and vii) sending, to an MNO infrastructure server 512, a complete parked order message indicating successful installation of the eSIM on the eUICC of the mobile wireless device, where the MNO infrastructure server 512, responsive to the complete parked order message, activates subscription service for the eSIM 208 for the mobile wireless device 102, and the mobile wireless device 102 disables the pSIM after successful activation of the eSIM 208.

In some embodiments, the pSIM installed in the mobile wireless device 102 includes a limited functionality SIM for establishing an over-the-air (OTA) cellular connection for activation of the eSIM 208 for the mobile wireless device 102 via an access point name (APN) reserved for activation of SIMs associated with the MNO 114 associated with the mobile wireless device 102. In some embodiments, the eSIM installation message includes a network address of a provisioning server 116 from which to download the eSIM 208. In some embodiments, the one or more network-based servers 508, 510 include a device manufacturer managed device services server 508 for communicating with mobile wireless devices 102 and a device manufacturer managed MNO services server 510 for communicating with one or more MNO servers 512, 116.

In some embodiments, a mobile wireless device 102 includes wireless circuitry comprising one or more antennas, and one or more processors communicatively coupled to the wireless circuitry and to a memory storing instructions that, when executed by the one or more processors, cause the mobile wireless device 102 to install and activate an electronic Subscriber Identity Module (eSIM) 208 for access to services of a mobile network operator (MNO) 114 by at least: i) sending, to a network-based server, a request activation message to initiate eSIM installation and activation; ii) receiving, from the network-based server, responsive to successful authentication of a user of the mobile wireless device, an eSIM installation message indicating the eSIM 208 reserved for the mobile wireless device 102 and a first ICCID value for a physical SIM (pSIM) installed in the mobile wireless device 102 at a time of manufacture; iii) determining whether the first ICCID value matches a second ICCID value of a pSIM included in the mobile wireless device 102; and when a) the first ICCID value matches the ICCID value of the pSIM included in the mobile wireless device 102 and b) a non-cellular connection is unavailable and cannot be established for provisioning and activation of the eSIM 208: iv) establishing a secure over-the-air (OTA) cellular connection to an MNO provisioning server 116 associated with the eSIM 208 via a limited functionality of the pSIM; v) obtaining, via the secure OTA cellular connection, the eSIM 208 from the MNO provisioning server 116; vi) installing the eSIM 208 on an embedded universal integrated circuit card (eUICC) 108 of the mobile wireless device 102; and vii) sending, to the MNO provisioning server 116, an indication of successful installation of the eSIM 208 on the eUICC 108 of the mobile wireless device 102.

In some embodiments, the mobile wireless device 102, after i) successful installation of the eSIM 208 on the eUICC 108 and ii) after successful attachment to cellular wireless network of the MNO 114 via the eSIM 208, disables the pSIM included in the mobile wireless device 102. In some embodiments, disabling the pSIM comprises rendering the pSIM unusable for establishing cellular connections. In some embodiments, the mobile wireless device 102, after successful installation of the eSIM 208 on the eUICC 108, bypasses presentation of a dual SIM setup process when the first ICCID value matches the ICCID value of the pSIM included in the mobile wireless device 102. In some embodiments, the mobile wireless device 102, when a) the first ICCID value does not match the ICCID value of the pSIM included in the mobile wireless device 102 or b) a non-cellular connection can be established for provisioning and activation of the eSIM 208, presents a prompt to a user of the mobile wireless device 102 to establish the non-cellular connection and subsequently obtains and installs the eSIM 208 via the non-cellular connection.

In some embodiments, a mobile wireless device 102 includes wireless circuitry comprising one or more antennas, and one or more processors communicatively coupled to the wireless circuitry and to a memory storing instructions that, when executed by the one or more processors, cause the mobile wireless device 102 to install and activate an electronic Subscriber Identity Module (eSIM) 208 by at least: i) initiating an activation process for the mobile wireless device 102; ii) determining whether a first ICCID value of a physical SIM (pSIM) installed in the mobile wireless device 102 corresponds to a particular mobile network operator (MNO) 114 indicated in a carrier bundle included in the mobile wireless device 102, where the particular MNO 114 supports eSIM activation via a limited functionality pSIM; iii) when the first ICCID value of the pSIM corresponds to the particular MNO 114, querying an infrastructure server 512 of the particular MNO 114 to determine whether the first ICCID value for the pSIM installed in the mobile wireless device 102 at a time of manufacture indicates a warm SIM usable for eSIM activation; and iv) when a) the infrastructure server 512 of the particular MNO 114 indicates the first ICCID value for the pSIM is the warm SIM and b) a non-cellular connection is unavailable and cannot be established for provisioning and activation of the eSIM 208: v) establishing a secure over-the-air (OTA) cellular connection to an MNO provisioning server 116 associated with the eSIM 208 via a limited functionality of the pSIM; vi) obtaining, via the secure OTA cellular connection, the eSIM 208 from the MNO provisioning server 116; vii) installing the eSIM 208 on an embedded universal integrated circuit card (eUICC) 108 of the mobile wireless device 102; viii) sending, to the MNO provisioning server 116, an indication of successful installation of the eSIM 208 on the eUICC 108 of the mobile wireless device 102.

In some embodiments, the mobile wireless device 102, after successful installation of the eSIM 208 on the eUICC 108, bypasses presentation of a dual SIM setup process after reconfirming i) the first ICCID value of the pSIM installed in the mobile wireless device 102 corresponds to the particular MNO 114 indicated in the carrier bundle, and ii) the first ICCID value of the pSIM included in the mobile wireless device 102 indicates the pSIM is the warm SIM. In some embodiments, the mobile wireless device 102, after i) successful installation of the eSIM 208 on the eUICC 108 and ii) after successful attachment to cellular wireless network of the particular MNO 114 via the eSIM 208, disables the pSIM included in the mobile wireless device 102. In some embodiments, the mobile wireless device 102 disables the pSIM by at least rendering the pSIM unusable for establishing cellular connections.

Wireless Terminology

In accordance with various embodiments described herein, the terms "wireless communication device," "wireless device," "mobile wireless device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) Long Term Evolution (LTE), LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode UE can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

Regarding the present disclosure, it is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for electronic Subscriber Identity Module (eSIM) provisioning to a wireless device, the method comprising:
by the wireless device:
receiving, from a network-based server, an eSIM installation message indicating an eSIM reserved for the wireless device and a first ICCID value for a first physical SIM (pSIM) installed in the wireless device at a time of manufacture;
determining whether the first ICCID value matches a second ICCID value of a second pSIM presently included in the wireless device; and
when i) the first ICCID value matches the second ICCID value and ii) provisioning of the eSIM is unavailable via a non-cellular connection:
downloading, via a cellular connection established via a limited functionality of the second pSIM, the eSIM from a provisioning server of a mobile network operator (MNO); and
installing the eSIM on an embedded universal integrated circuit card (eUICC) of the wireless device.

2. The method of claim 1, further comprising:
by the wireless device:
sending, to the provisioning server of the MNO, an indication of successful installation of the eSIM on the eUICC of the wireless device.

3. The method of claim 1, wherein the cellular connection includes an access point name (APN) reserved for activation of SIMs associated with the MNO.

4. The method of claim 1, further comprising:
by the wireless device:
after successful attachment to a cellular wireless network of the MNO via the eSIM, disabling the second pSIM included in the wireless device.

5. The method of claim 1, wherein:
the eSIM installation message includes a network address for the provisioning server from which to download the eSIM.

6. The method of claim 1, further comprising:
by the wireless device:
when the first ICCID value does not match the second ICCID value, presenting a prompt via a display of the wireless device indicating a requirement to establish a non-cellular connection to obtain the eSIM.

7. The method of claim 6, further comprising:
by the wireless device:
downloading the eSIM from the provisioning server of the MNO to the eUICC of the wireless device when a non-cellular connection is established.

8. A method for electronic Subscriber Identity Module (eSIM) provisioning to a wireless device, the method comprising:
by the wireless device:
determining whether a physical subscriber identity module (pSIM) presently installed in the wireless device is in a warm state configured to be used as a limited functionality pSIM for provisioning an eSIM to the wireless device;
when the pSIM is in the warm state:
downloading, via a cellular connection established via a limited functionality of the pSIM, the eSIM from a provisioning server of a mobile network operator (MNO); and
installing the eSIM on an embedded universal integrated circuit card (eUICC) of the wireless device.

9. The method of claim 8, wherein the pSIM presently installed in the wireless device is restricted for use with a particular MNO or virtual MNO (VMNO).

10. The method of claim 8, wherein determination that the pSIM is in the warm state is based on information included in a carrier bundle preinstalled in the wireless device at a time of manufacture or downloaded to the wireless device from an original equipment manufacturer (OEM) managed network server.

11. The method of claim 8, wherein determination that the pSIM is in the warm state is based on receipt of a message from an entitlement server of the MNO responsive to a query sent by the wireless device, the message indicating directly or indirectly that the pSIM is in the warm state.

12. The method of claim 11, wherein:
the query comprises a getAuthentication message; and
the message from the entitlement server includes a warm code for the pSIM after successful authentication by the wireless device with the entitlement server using credentials from the pSIM.

13. The method of claim 8, wherein the cellular connection includes an access point name (APN) reserved for activation of SIMs associated with the MNO.

14. The method of claim 8, further comprising:
by the wireless device:
after successful attachment to a cellular wireless network of the MNO via the eSIM, disabling the pSIM included in the wireless device.

15. The method of claim 14 wherein disablement of the pSIM renders the pSIM unusable for establishing cellular connections.

16. The method of claim 8, further comprising:
by the wireless device:
bypassing presentation of a dual SIM setup process after re-determining that the pSIM is in the warm state and corresponds to the MNO associated with the eSIM downloaded from the provisioning server of the MNO.

17. The method of claim 16, wherein re-determination that the pSIM is in the warm state comprises receipt, from an entitlement server of the MNO responsive to a query sent by the wireless device, of a message indicating that the pSIM is in the warm state.

18. A wireless device comprising:
wireless circuitry comprising one or more antennas; and
one or more processors communicatively coupled to the wireless circuitry and to a memory storing instructions that, when executed by the one or more processors, cause the wireless device to provision an electronic Subscriber Identity Module (eSIM) for access to services of a mobile network operator (MNO) by:
determining whether a physical subscriber identity module (pSIM) presently installed in the wireless device is in a warm state configured to be used as a limited functionality pSIM for provisioning an eSIM to the wireless device;

when the pSIM is in the warm state:
downloading, via a cellular connection established via a limited functionality of the pSIM, the eSIM from a provisioning server of the MNO; and
installing the eSIM on an embedded universal integrated circuit card (eUICC) of the wireless device.

19. The wireless device of claim 18, wherein determination that the pSIM is in the warm state is based on information included in a carrier bundle preinstalled in the wireless device at a time of manufacture or downloaded to the wireless device from an original equipment manufacturer (OEM) managed network server.

20. The wireless device of claim 18, wherein determination that the pSIM is in the warm state is based on receipt of a message from an entitlement server of the MNO responsive to a query sent by the wireless device, the message including a warm code for the pSIM after successful authentication by the wireless device with the entitlement server using credentials from the pSIM.

\* \* \* \* \*